(12) United States Patent  (10) Patent No.: US 9,161,071 B2
Bugenhagen  (45) Date of Patent: Oct. 13, 2015

(54) SYSTEM AND METHOD FOR CONTENT OWNER CONTROLLABLE HOSTED DISTRIBUTIONS SYSTEM

(71) Applicant: CenturyLink Intellectual Property LLC, Denver, CO (US)

(72) Inventor: Michael Bugenhagen, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 57 days.

(21) Appl. No.: 13/746,747

(22) Filed: Jan. 22, 2013

(65) Prior Publication Data

US 2013/0318549 A1 Nov. 28, 2013

Related U.S. Application Data

(63) Continuation of application No. 12/508,386, filed on Jul. 23, 2009, now Pat. No. 8,375,412.

(60) Provisional application No. 61/083,136, filed on Jul. 23, 2008.

(51) Int. Cl.
*H04N 21/2665* (2011.01)
*G06Q 30/02* (2012.01)
(Continued)

(52) U.S. Cl.
CPC ............ *H04N 21/2665* (2013.01); *G06F 21/10* (2013.01); *G06Q 30/02* (2013.01); *G06Q 30/0246* (2013.01); *G06Q 30/0261* (2013.01); *G06Q 30/0264* (2013.01); *G06Q 30/0274* (2013.01); *G06Q 30/0277* (2013.01); *G06Q 30/0283* (2013.01); *G06Q 30/04* (2013.01);
(Continued)

(58) Field of Classification Search
CPC . H04N 21/222; H04N 21/2225; H04N 21/23; H04N 21/231; H04N 21/2381; H04N 21/25808; H04N 21/25825; H04N 21/25833; H04N 21/26291; H04N 21/27; H04N 21/278; H04N 21/4586; H04N 21/6547
USPC ........... 725/37, 38, 39, 48, 49, 105, 109, 114, 725/115, 116
See application file for complete search history.

(56) References Cited

U.S. PATENT DOCUMENTS 6,216,152 B1 * 4/2001 Wong et al. .................... 709/203
6,948,183 B1 9/2005 Peterka
(Continued)

OTHER PUBLICATIONS

U.S. Appl. No. 12/508,386; Final Rejection dated Apr. 19, 2012; 14 pages.
(Continued)

*Primary Examiner* — John Schnurr
(74) *Attorney, Agent, or Firm* — Swanson & Bratschun, L.L.C.

(57) ABSTRACT

The disclosed embodiments include a method for distributing content over a network. The method includes providing by a communications service provider a content distribution node. Content stored by the content distribution node is accessible to subscriber of the communications service provider without traversing the Internet for enabling a quality of service guarantee. The content distribution node is configured to store a content mall comprising a plurality of content stores. The content distribution node is configured to grant access to a plurality of content providers to store content to a respective content store in the content mall. The content provider maintains control over content stored in their respective content store.

20 Claims, 19 Drawing Sheets

(51) Int. Cl.
*G06Q 30/04* (2012.01)
*H04N 21/254* (2011.01)
*G06F 21/10* (2013.01)
*H04N 21/81* (2011.01)

(52) U.S. Cl.
CPC .......... *H04N 21/254* (2013.01); *H04N 21/812* (2013.01)

(56) References Cited

U.S. PATENT DOCUMENTS

| | | | |
|---|---|---|---|
| 7,075,919 B1 | 7/2006 | Wendt et al. | |
| 7,606,925 B2 * | 10/2009 | Sheldon | 709/231 |
| 7,689,462 B1 * | 3/2010 | Wittsche | 705/26.1 |
| 7,818,769 B2 * | 10/2010 | Peacock et al. | 725/54 |
| 8,375,412 B2 | 2/2013 | Bugenhagen | |
| 8,468,099 B2 * | 6/2013 | Headings et al. | 705/59 |
| 2001/0001160 A1 | 5/2001 | Shoff et al. | |
| 2003/0031455 A1 * | 2/2003 | Sagar | 386/35 |
| 2004/0221303 A1 * | 11/2004 | Sie et al. | 725/29 |
| 2007/0162953 A1 | 7/2007 | Bolliger et al. | |
| 2008/0109433 A1 | 5/2008 | Rose | |
| 2008/0207182 A1 | 8/2008 | Maharajh et al. | |
| 2010/0023395 A1 | 1/2010 | Bugenhagen | |
| 2010/0023993 A1 | 1/2010 | Bugenhagen | |

OTHER PUBLICATIONS

U.S. Appl. No. 12/508,386; Issue Notification dated Jan. 23, 2013; 1 page.
U.S. Appl. No. 12/508,386; Non-Final Rejection dated Dec. 6, 2011; 15 pages.
U.S. Appl. No. 12/508,386; Notice of Allowance dated Oct. 9, 2012; 13 pages.
U.S. Appl. No. 12/508,390; Final Rejection dated May 24, 2012; 15 pages.
U.S. Appl. No. 12/508,390; Non-Final Rejection dated Feb. 1, 2012; 21 pages.
U.S. Appl. No. 12/508,390; Non-Final Rejection dated Jun. 19, 2014; 23 pages.
U.S. Appl. No. 12/508,390; Non-Final Rejection dated Jan. 26, 2015; 29 pages.
U.S. Appl. No. 12/508,390; Final Rejection dated Jun. 26, 2015; 18 pages.

* cited by examiner

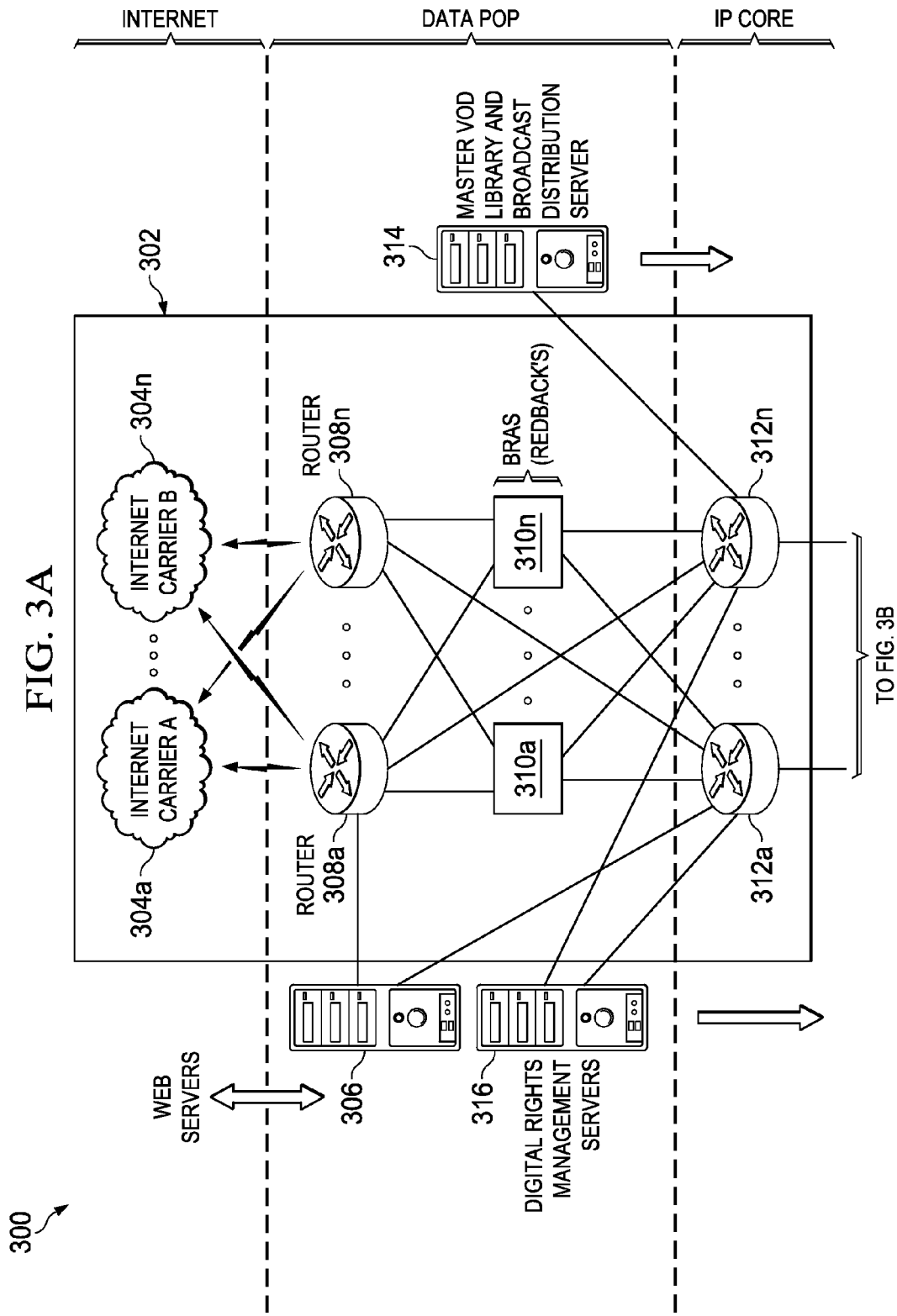

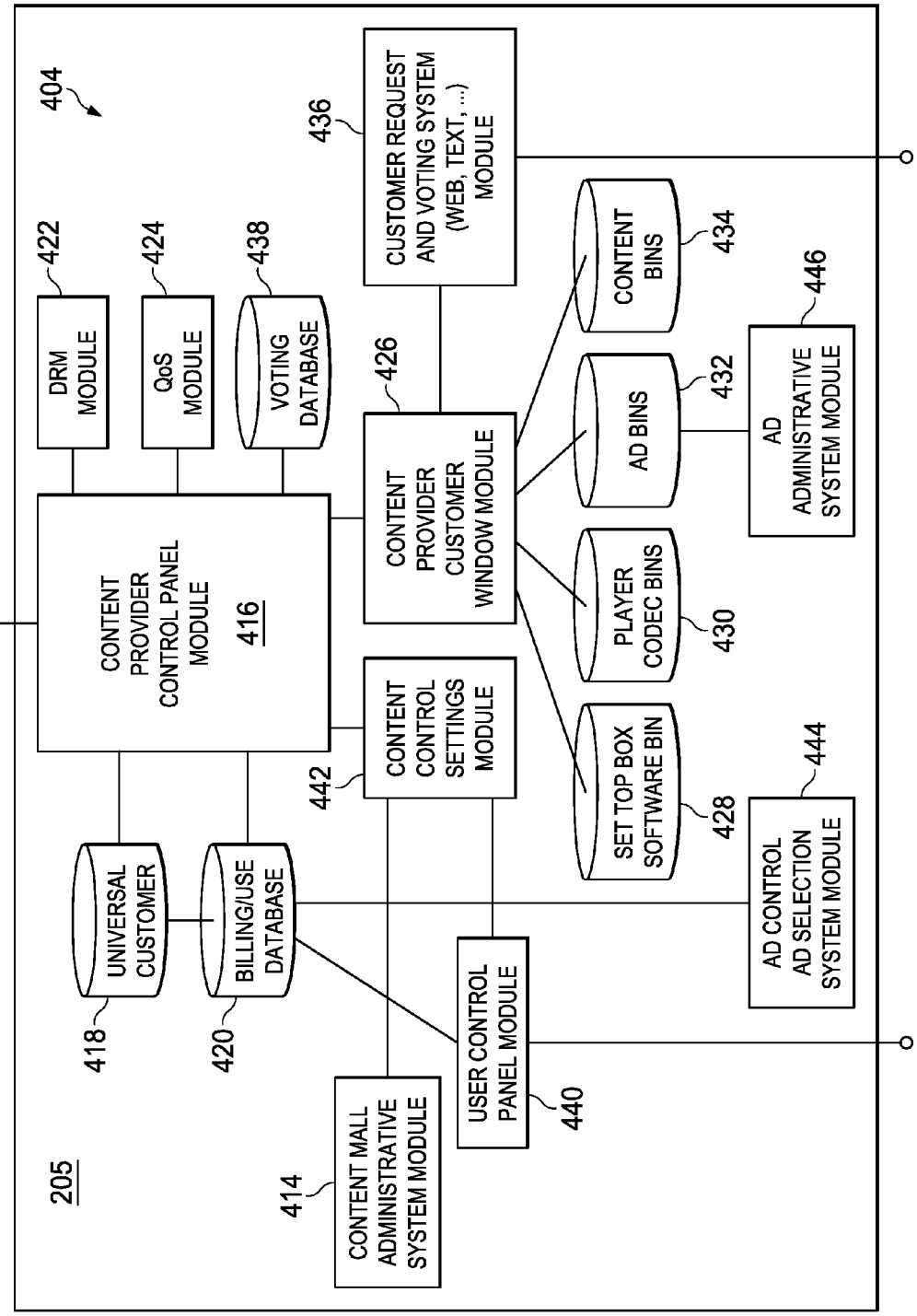

File Edit View Favorites Tools Help
Back Forward Stop Refresh Home Search Favorites Print
Addr: http://www.contentmall.com/content_provider_control_panel

Content Provider Control Panel — 510

DRM — 512

| | 513 ↗ VOD | PPV | BROADCAST | FREE | GAMES |
|---|---|---|---|---|---|
| PAY SUBSCRIBERS | ● | ● | ● | ● | ● |
| NON-PAY SUBSCRIBERS | ● | ○ | ● | ● | ○ |
| STB CUSTOMERS | ● | ● | ● | ● | ● |
| WEB CUSTOMERS | ● | ● | ○ | ● | ● |

BILLING — 514

| | FIXED PRICE | VARIABLE PRICE | ADS | FREE |
|---|---|---|---|---|
| VOD | ● | ● | ● | ○ |
| PPV | ○ | ○ | ○ | ○ |
| BROADCAST | ● | ○ | ● | ● |
| FREE | ○ | ○ | ○ | ● |
| GAMES | ● | ○ | ○ | ○ |

CHANNELS — 516

| 1 | VOD | 7 | BROADCAST |
| 2 | VOD | 8 | PPV |
| 3 | VOD | 9 | PPV |
| 4 | VOD | 10 | TIME SHIFTED |
| 5 | BROADCAST | 11 | TIME SHIFTED |
| 6 | BROADCAST | 12 | GAMES |

SPECIAL EVENTS — 518

| | | TIME | DATE |
|---|---|---|---|
| 1 | FIGHT | 7:30PM | 7/14/09 |
| 2 | WORLD SERIES | 8:00PM | 10/1/09 |

SUBMIT — 519

Communications Service Provider Control Panel 500

File Edit View Favorites Tools Help
Back Forward Stop Refresh Home Search Favorites Print
Addr: http://www.contentmall.com/content_provider_control_panel

CAPACITY — 522

| CUSTOMER | STORAGE | NOTIFICATION |
|---|---|---|
| TV NETWORK | 100GB | <10GB |
| MOVIE STUDIO | 1TB | <100GB |
| AGGREGATOR | 25GB | <5GB |

520

| PARTITION | HD | SD | OTHER | DISTRIBUTION | # CHANNELS | BW/CH |
|---|---|---|---|---|---|---|
|  | 50GB | 40GB | 10GB |  | 12 | 10MB |
|  | 750GB | 100GB | 150GB |  | 8 | 10MB |
|  | 10GB | 10GB | 5GB |  | 24 | 8MB |

STATS — 524

|  | YES | NO |
|---|---|---|
| DOWNLOADS | ● | ○ |
| BROWSES | ● | ○ |
| VISITS | ● | ○ |
| PREVIEW VIEWS | ● | ○ |
| FULL VIEWS | ○ | ● |
| LAST DOWNLOAD | ● | ○ |

BILLING — 526

|  | MIN |
|---|---|
| VOD | $1.99 |
| PPV | $4.99 |
| BROADCAST | $0.00 |

ADS — 528

|  | TIMING | INSERTION |
|---|---|---|
| VOD | YES | INSERTION |
| PPV | NO | - |
| BROADCAST | YES | INSERTION |
| GAMES | YES | PRELOAD |

SUBMIT — 529

FIG. 5C

| | | RATINGS | | | | | AD CATEGORIES | | | | |
|---|---|---|---|---|---|---|---|---|---|---|---|
| LOGIN NAME | PASSWORD | G | PG | R | ADULT | HOME | SPORTS | CARS | FOOD | TOYS | REST |
| JOHN SMITH | DADDY | ● | ● | ● | ● | ○ | ○ | ● | ● | ○ | ● |
| LISA SMITH | MOMMY | ● | ● | ● | ○ | ● | ● | ○ | ● | ○ | ● |
| BRIANA SMITH | DAUGHTER | ● | ○ | ○ | ○ | ○ | ○ | ○ | ○ | ● | ○ |

| | GAME RATINGS | | | | | |
|---|---|---|---|---|---|---|
| | EC | E | E10+ | T | M | AO |
| | ● | ○ | ○ | ○ | ○ | ○ |
| | ● | ● | ○ | ○ | ○ | ○ |
| | ● | ○ | ○ | ○ | ○ | ○ |

FIG. 5D

SYSTEM AND METHOD FOR CONTENT OWNER CONTROLLABLE HOSTED DISTRIBUTIONS SYSTEM

RELATED APPLICATIONS

This application claims priority to U.S. patent application Ser. No. 12/508,386, filed Jul. 23, 2009, which claimed priority to U.S. provisional patent application Ser. No. 61/083,136 entitled "System and Method for Content Owner Controllable Hosted Distributions System," the entire contents of which are hereby incorporated by reference in their entirety.

BACKGROUND

The Internet has become a main source of intercommunication throughout the United States and the world. Content, including audio and video, may be downloaded and played by consumers anywhere with access to the Internet. However, as high-definition (HD) video content and video on demand (VOD) have begun to become dominant standards for people to watch video, the ability to provide such high bandwidth via the Internet has become a daunting problem for communications service providers and content providers.

As understood in the art, tier 1 Internet providers that provide long haul transport of IP charge a premium for bandwidth capacity to local Internet service providers (ISPs). For example, long haul data traffic may cost an ISP $0.05 per megabyte ($0.05/MB), which may cost an ISP $100,000 per month or more. As content providers shifted website content to video, the cost of transport increased exponentially due to losing the ability to over-subscribe the traffic. Now that storage cost of decentralization has become cheaper than transport cost, network configuration for delivering content requires evolution.

There are several business models and website models that are used by content providers, such as Disney® and ESPN® television networks, that make content available to users of the World Wide Web. Conventional website models maintain video content at a central network location and a user downloads the video content when he or she opens a webpage that includes a frame or selection mechanism to download the video content to a media player on a laptop or set-top box. The video content typically is communicated over the Internet via a long haul communications service provider to a local ISP servicing the user. Such a model has a number of problems, including (i) cost for communicating data, (ii) "bottleneck" that exists at a local ISP connection to the Internet, (iii) inability for data communicated over the Internet to be guaranteed quality of service (QoS), and (iv) having limited bandwidth over the Internet. Additional problems exist for the model, including not knowing specific geographic location of the user, which limits targeted, geographic based advertising.

More specifically, peer-to-peer traffic flows on the Internet are generally scalable for short duration communication flows, such as data files and email. Short duration video, such as YouTube® video files, has created massive bandwidth increases that threaten to break the economic model of the Internet. Consumer television has been progressively moving from broadcast to on demand, as available via YouTube® and other video content providers. On demand television has changed the number of simultaneously transmitted channels from a single broadcast channel to a viewing region with many viewers to a single channel per subscriber. Neither the Internet nor regional core IP networks are economically scalable to sustain the amount of bandwidth needed to support video on demand type channel per subscriber service. The FCC has mandated high-definition television (HDTV), which requires three to five times more bandwidth capacity than standard definition television signals. The increase in bandwidth is needed for both RF and IPTV to meet the FCC mandate, as standard definition IPTV uses 2.5 megabits and HDTV uses 10 megabits per live stream. Furthermore, broadcast IPTV requires packet loss rates in the range of 10-6, which is a much higher requirement than can be provided via the Internet that typically requires 10-4. The Internet's best effort packet loss rate requirement coupled with the "best efforts" QoS communications design creates problems for near and long-term scalability to support video on demand.

One content distribution model that exists is offered by a content distribution network (CDN) service provider. A CDN is a service provider that manages a system of networked computers across the Internet that function to deliver content in a more efficient manner. Typically, a CDN places servers at the edge of an Internet provider network and website content is distributed to the local servers of the Internet for users to download regionally. While the CDN model is better than the centralized content distribution model, the CDN model has a few fundamental problems, as well. Typically, content owners desire to maintain control over the content and distribution thereof. The CDN model relinquishes control of the content by the content provider to the CDN. Another problem for the CDN is the financial model. Content providers tend to make the most money on the Internet, while service providers, such as CDNs, make the least. Still yet, the CDNs have little, if any, knowledge about physical locations of users, thereby limiting the ability for local advertisers to target local customers. Lastly, due to these servers being located outside of the network of the communications service provider or access provider, the CDNs still only provide best effort traffic with no QoS guarantees.

In summary, there are a number of fundamental problems for delivering content, especially high-definition content, via the Internet, as described above. Furthermore, financial models for delivering content in general (e.g., on demand television content) have been limited. Advertisers have yet to fully accept the delivery models because advertising has been unable to be targeted to known desired audiences. Television broadcasters have made efforts to distribute content to the Internet and mobile devices. However, the television broadcasters have experienced the problems identified above with no viable solutions to address all of the issues.

SUMMARY

The principles of the present invention provide for a communications service provider to provide content providers with a "data mall" or "content mall" to operate, control, sell, and distribute content via different types of "storefronts." The storefronts, which are located outside of the Internet and internal to an access or communications service provider network, may enable the content providers to distribute content to subscribers of the communications service provider without leasing Internet bandwidth for operating centralized servers. The storefronts can be brand driven, such as Sears® store presence at a local mall, distributor oriented, such as a music store, or completely generic by simply offering content with advertising space or, in this case, ad insertion around web interfaces and with selected and played content. It should be understood that both stored content, such as video on demand and live feeds, may be provided by the content owner. These content feeds are uploaded or continuously fed to the content mall for distribution and control by the content provider on an access network or communications service provider's hosted content mall content distribution system.

The communications service provider may provide the content provider or owner with a remote content management application that is pre-configured with software tools to enable the content provider to upload and maintain ownership control of the content that is being provided to users on the access network with guaranteed QoS and very high bandwidth connectivity. Furthermore, the content provider may have access to granular or specific subscriber location information from details on the service provider network, which allows for targeted local advertising to be preformed. In one embodiment, the content provider may operate as a national network and the communications service provider may operate as a local affiliate of the national network (i.e., content provider), thereby enabling the communications service provider to distribute local advertising to users who access the website of the content provider. Alternatively, the content provider may operate as a local affiliate to the communications service provider to provide advertisers with specific audiences based on demographics and/or geographic locations. The "content mall" may include multiple content providers that are each provided with the same remote content management application with the same remote content management applications or software tools that may be utilized to configure the storefronts to operate as desired by each respective content provider. In addition, users may utilize universal set-top boxes that may be configured to interact with the remote content management application to download one or more digital rights management keys and codecs for interacting with the specific content provided by each content provider. The universal set-top boxes may further provide for controls to communicate with the storefronts of the content providers.

Set-Top Box

One embodiment of a set-top box may include a storage unit, input/output (I/O) unit configured to communicate with a network node of a service provider over a communications network, memory unit, and a processing unit in communication with the storage unit, I/O unit, and memory unit. A user control panel module may be executed by the processing unit and configured to cause the processing unit to present a graphical user interface to a user to control access to one or more content stores of a content mall operating on the network node. A service provider control panel module may be executed by the processing unit and be configured to cause the processing unit to enable the communications service provider to control operation of the processing unit. A codec module may be executed by the processing unit and configured to enable the processing unit to display content downloaded from a content store of the content mall.

Content Server

One embodiment of a system of a communications service provider for distributing content of a content provider may include a webserver in communication with the Internet, and configured to provide subscribers of the communications service provider with access to content stored at said webserver without having to access the Internet. A remote content management application may be operated on the webserver and be configured with at least one data storage bin configured to store content and advertising content. The remote content management application may be utilized by the content provider to store the content and advertising content. The remote content management application may further be configured to provide the content provider with digital rights management and guaranteed quality of service (QoS) to subscribers of the communications service provider who access content stored by the remote content management application.

One embodiment of a method for a content provider to distribute content may include configuring a webserver to be in communication with the Internet and be accessible to subscribers of a communication service provider without accessing the Internet. The content provider may be enabled to store content in at least one data storage bin at the webserver, where the webserver may further be configured to provide digital rights management for the content provider and guaranteed QoS to the subscribers when downloading the content. The content may be communicated from the webserver with guaranteed QoS to the subscribers.

Data Mall

One embodiment of a system for providing content providers with network distribution nodes for distributing content to subscribers of a communications service provider may include a plurality of network nodes maintained by the communications service provider and in communication with the Internet. The network nodes may be configured to enable subscribers of a communications service provider to access and download content without the content having to be communicated over the Internet. Multiple remote content management applications may be executed on each of the respective network nodes and enable a plurality of respective content providers to store content at the network nodes for subscribers local to each respective network node to download the content. Multiple customer databases may be operated by respective remote content management applications. The customer databases may be configured to store information associated with subscribers of the communications service provider. The remote content management applications may provide limited access to the information stored in the customer database to prevent the respective content provider from accessing personal information of the subscribers.

One embodiment of a method for providing content providers with network distribution nodes for distributing content to subscribers of a communications service provider may include maintaining multiple network nodes by the communications service provider, where the network nodes may be in communication with the Internet and be configured to enable subscribers of the communications service provider to access and download content without the content having to be communicated over the Internet. Multiple respective content service providers may be enabled to store content at the network nodes for subscribers local to each respective network node to download the content. Multiple customer databases configured to store information associated with subscribers of the communications service provider may be operated. Limited access to the information stored in the customer databases may be provided to prevent the respective content providers from accessing personal information of the subscribers. The personal information may include name, street address, and/or telephone number of the subscribers.

Revenue Sharing

One embodiment of a method for a communications service provider and content provider to share revenue may include providing, by the communications service provider, a network node configured to enable the content provider to post content to be available to subscribers of the communications service provider. The network node may be in communication with the Internet but being accessible to subscribers without accessing the Internet. A graphical user interface via which the local subscribers can download the content may be provided. The content provider may be enabled to set a price for a subscriber to download the content. If there is a cost for the subscribers to download the content, then a revenue share percentage may be established between the content provider and the communications service provider. Otherwise, the communications service provider may be enabled to display an advertisement to the subscribers and collect revenue from advertising. In response to the subscribers downloading the content, the revenue generated by the content being downloaded may be accounted for. The content provider may be provided with the accounting for the content download.

One embodiment of a system for a communications service provider and content provider to share revenue may include a storage unit configured to store a content database, a billing database, and an advertisements database. An input/output (I/O) unit may be configured to communicate with the Internet and local subscribers of the communications service provider without communicating over the Internet. A processing unit may be in communication with the storage unit and I/O unit. The processing unit may be configured to enable the content provider to store content in the content database, enable the content provider to set a price for subscribers to download the stored content, and determine whether the content provider set a price for the subscribers to download the stored content. If the content provider set a price for the subscribers to download the stored content, the processing unit may account for a total amount of revenue collected from the subscribers downloading the content. Otherwise, if the content provider does not set a price for the subscribers to download the stored content, the processing unit may be configured to enable the communications service provider to store advertising content in the advertisements database and communicate a stored advertisement to the subscribers who access the stored content.

IPTV Delivery System

One embodiment of a system for broadcasting content as IPTV may include a memory configured to store data, a storage unit configured to store data, and an input/output (I/O) unit configured to communicate data over a communications network. A first input unit may be configured to receive broadcast feed content. A first output unit may be configured to communicate the broadcast feed content to set-top boxes with a guaranteed QoS. A second output unit may be configured to communicate the broadcast feed content in a rasterized format to mobile devices with a guaranteed QoS. A processing unit may be in communication with the memory, I/O unit, and storage unit. The processing unit may be configured to convert the broadcast feed content into a first data format for broadcasting to set-top boxes, convert the broadcast feed content into a second data format for broadcasting to mobile devices, and broadcast the converted broadcast feed content via said first and second output units to set-top boxes and mobile devices in the first and second data formats, respectively.

One method for broadcasting content as IPTV may include receiving broadcast feed content. The broadcast feed content may be converted into a first data format for broadcasting to set-top boxes. The broadcast feed content may be converted into a second data format for broadcasting to mobile devices. The converted broadcast feed content may be broadcast to set-top boxes and mobile devices in the first and second data formats, respectively.

Virtual Broadcaster Network

One method for operating a virtual broadcast network may include using, by a virtual broadcaster, a network server remotely located from the virtual broadcaster and managed by a communications service provider to host a virtual broadcast network. A selection, via a control panel, of at least one broadcast content feed from a plurality of different content service providers may be performed. The selected broadcast content feeds may be broadcast to users who access the virtual broadcast network.

A system for operating a virtual broadcast network may include a first virtual television network system configured to broadcast first content channels over a communications network. A second virtual television network system may be configured to broadcast second content channels over the communications network. A third virtual television network system may be configured to enable a user to select at least one of the first content channels and at least one of the second content channels to be routed to the third virtual television network server for broadcasting over the communications network.

BRIEF DESCRIPTION

Illustrative embodiments of the present invention are described in detail below with reference to the attached drawing figures, which are incorporated by reference herein and wherein:

FIG. 4B is a more detailed block diagram of the service provider server of FIG. 4A provided by a communications service provider to enable a content provider to store, manage, and distribute content to subscribers of the communications service provider in accordance with the principles of the present invention;

FIG. 5B is a screen shot of an illustrative graphical user interface of a content provider control panel that enables a content provider to control operation of the webserver and content stored thereon;

FIG. 5C is a screen shot of an illustrative graphical user interface of a communications service provider control panel that enable a communications service provider to manage operations of a webserver utilized by one or more content providers for distributing content to subscribers of the communications service provider;

FIG. 5D is a screen shot of an illustrative graphical user interface of a user control panel that enables users or subscribers of a communications service provider to control operations from a webserver to a set-top box or other device;

DETAILED DESCRIPTION

Figure 1:
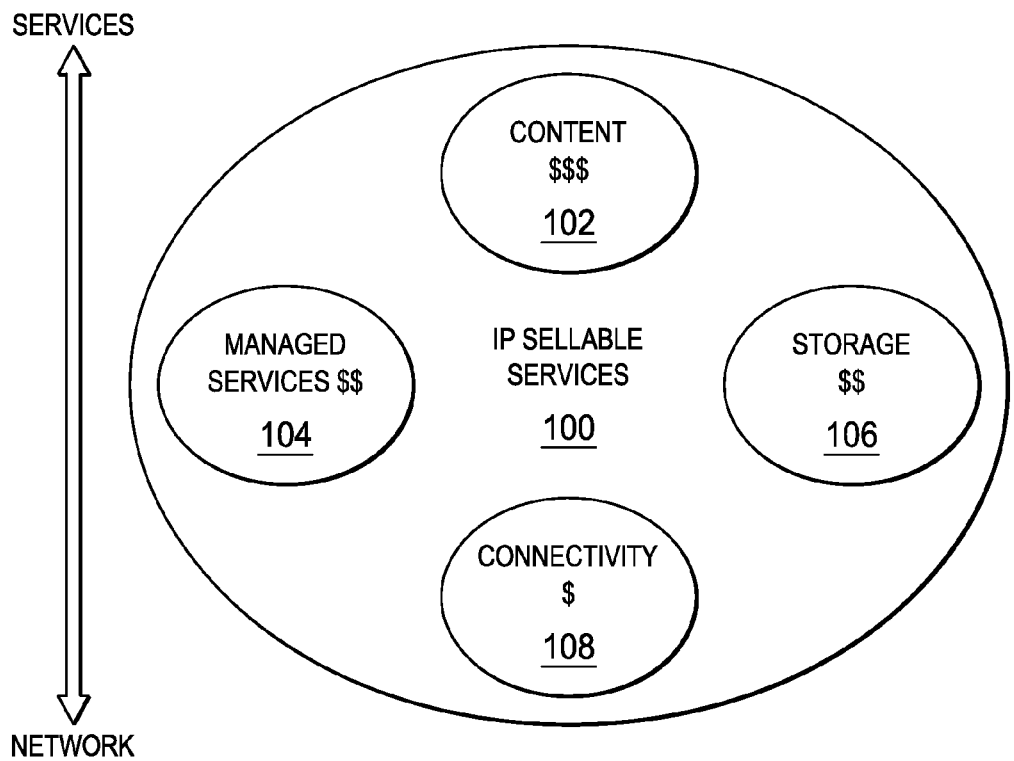
FIG. 1 is an illustration of illustrative IP sellable services and relative value for each of the IP sellable services.

With regard to FIG. 1, a diagram of illustrative IP sellable services 100 over an IP network as related to revenue, services, a network management is shown. As shown, content 102 is the most valuable service that is provided to users of an IP network, such as the Internet. Content 102 may be considered entertainment content (e.g., television shows, movies, cartoons, news programs, etc.), educational content (e.g., classroom video, adult education video, learning programs, etc.), or any other than advertising content (e.g., commercials, infomercials, or marketing content). After content 102, managed services 104 and storage services 106 have the most value to customers. The managed services 104 may include website hosting, website management, content delivery, and other managed services, as understood in the art. The storage services 106 may include storage of website content, storage of private data, storage of corporate data, and any other storage service, including backup services, as understood in the art. Connectivity services 108 are services that enable users to connect to the IP network. The connectivity services 108 are the least valuable and considered commodity services of the IP sellable services.

Figure 2:
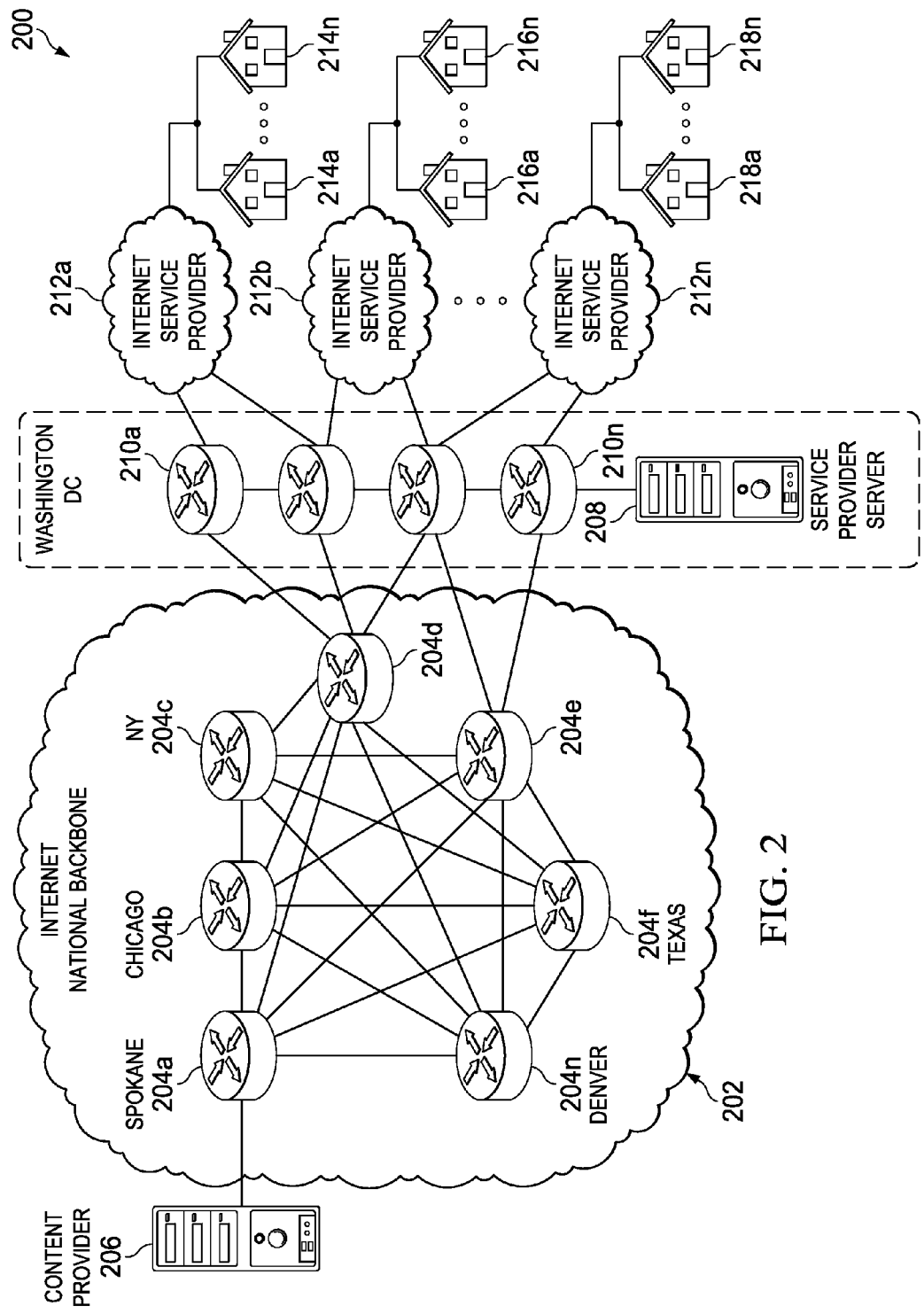
FIG. 2 is an illustration of a network environment provided by a communications service provider to deliver content to users in accordance with the principles of the present invention.

With regard to FIG. 2, an illustrative network environment 200 for IP communications via the Internet 202 is shown. The Internet 202 is shown to include multiple routers 204a-204n that define a "national backbone" for IP communications services over the Internet 202. While the Internet 202 is able to communicate data around the country between the routers 204, communications service providers that support the routers 204 limit liability by only providing a "best efforts" QoS level of communications. Best efforts QoS means that the service provider will use its best efforts to deliver data through its network at a certain QoS (e.g., bit error rate at a certain level, delay at a certain level, etc.), but is not required to deliver data at a guaranteed QoS. There are a variety of reasons that QoS cannot be guaranteed over the Internet 202, including priority of data, congestion, unpredictable levels of usage, and so forth.

Because the Internet 202 cannot deliver content or data with enough simultaneous bandwidth for VOD to each customer or a guaranteed QoS, content providers, such as Netflix®, Hulu®, and other content providers cannot deliver content over the Internet 202 in a manner that is satisfactory to customers. As such, content providers desire the ability to deliver content to users or customers with a guaranteed QoS. Content providers also desire certain levels of revenue that may result from delivering advertising to users who download content of the content provider. Content distribution networks that have distribution servers that are capable of delivering the content with a guaranteed QoS, however, are unable to specifically determine locations, identity, demographics, and so forth, as that information is typically maintained by a communications service provider and generally not provided to application providers, such as content distribution networks (CDNs).

Because communications service providers have specific information about customers or users of a communications network provided by the communications service provider, the communications service provider may provide network infrastructure that can satisfy the desires of a content provider being able to deliver content with a guaranteed QoS and enable advertisers to provide targeted advertising to customers of the communications service provider with specific geographic locations, identities, demographic information, and so forth. The communications service provider, however, may be able to provide such specific information to the content provider without having to give up specific identification information of the users or customers of the communications service provider in accordance with the principles of the present invention.

Continuing with FIG. 2, a content provider server 206 is shown to be in communication with a router 204a that operates as a network access point or gateway for the content provider server 206. A service provider server 208 that is located on the other side of the Internet 202 may be configured to provide a guaranteed QoS for customers of the communications service provider that are able to access the service provider server 208 without having to access the service provider server 208 via the Internet 202. As shown, the service provider server 208 may be in communication with one or more routers 210a-210n (collectively 210) that operate as an access network for customers and communicate content via respective Internet service providers (ISPs) 212a-212n (collectively 212) to customers 214a-214n (collectively 214), 216a-216n (collectively 216), and 218a-218n (collectively 218), respectively. The customers 214, 216, and 218 may be subscribers of the communications service provider that supports the service provider server 208. Note that the service provider server 208 does not communicate directly with the routers 204 that operate as the Internet backbone. Because the ISPs 212 have relationships with each of the customers 214, 216, and 218, the ISPs 212, which may be part of a communications service provider, such as a local telephone company, the ISPs 212 may have the identities, demographics, and geographic locations of each of the customers 214, 216, and 218. The service provider server 218 may, therefore, be configured to enable the content provider to have a prepackaged content management and delivery system or "storefront" in a content mall that provides desired functionality of the content provider, as further described herein.

Figure 3B:
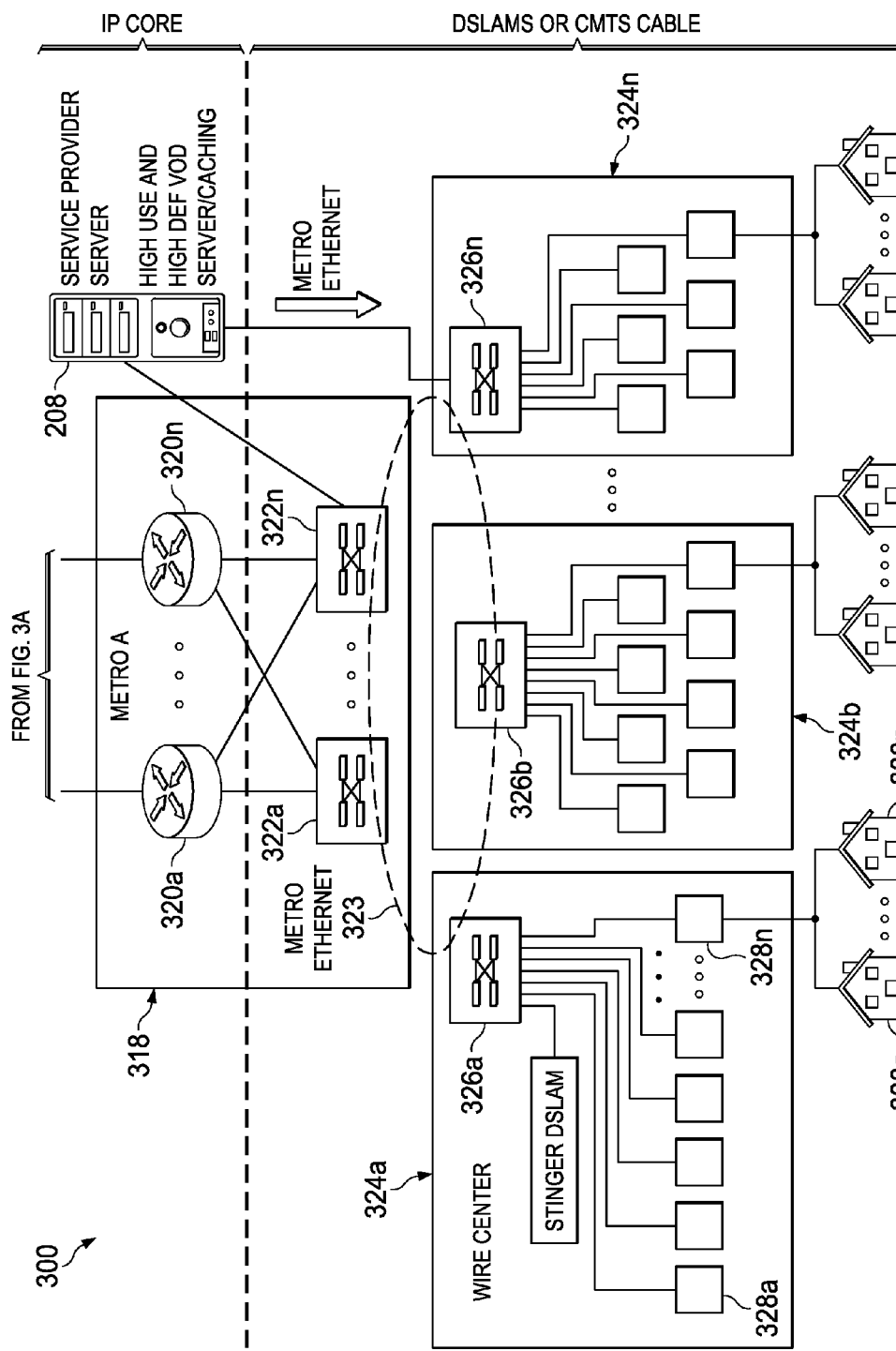
FIG. 3 is an illustration of an illustrative network environment in which content delivery systems are utilized to provide users with content without having to access the content via the Internet.

With regard to FIG. 3, an illustration of a more illustrative network environment 300 is shown to include the Internet 302 with Internet carrier networks 304a-304n (collectively 304) that operate to provide Internet communications, as shown in FIG. 2. Webservers 306 that are used to store and deliver content via the Internet carrier networks 304 may be in communication with routers 308a-308n (collectively 308) on the edge of the Internet 302 that communicate data or content via the Internet carrier networks 304 or bypass the Internet carrier networks 304 if the content is to be delivered locally. The routers 308n may be in communication with broadband remote access servers (BRAS) 310a-310n (collectively 310) that operate to route traffic to and from digital subscriber line access multiplexers (DSLAMs) on one or more Internet service provider network. The BRAS 310 may be in communication with routers 312a-312n (collectively 312). In one embodiment, a video on demand (VOD) library and broadcast distribution server 314 may be in communication with router 312n, and a middleware and digital rights management server 316 may be in communication with one or more of the routers 312. The video on demand library and broadcast distribution server 314 may be configured to store video content (e.g., movies, television shows, etc.), advertisements, digital rights management keys, and codecs. Configurable middleware and digital rights management servers 316 may be configured to provide for middleware functionality for users to access and display video content via a set-top box (not shown) from the video on demand library and broadcast distribution server 314, as understood in the art.

A metro Ethernet provider 318 may operate one or more routers 320a-320n (collectively 320) to which the routers 312 communicate. The routers 320 may communicate with switches or gateways 322a-322n to communicate data to a metro Ethernet 323 to which wire centers 324a-324n (collectively 324) are in communication via switches or gateways 326a-326n (collectively 326). Wire centers 324 are regional operational centers of a communications service provider, such as a local telephone company.

The wire centers 324, which are connected to the metro Ethernet 323 via gateways 326, may operate DSLAMs 328a-328n (collectively 328) to deliver data and content to customers of the communications service provider or Internet service provider, as understood in the art. As shown, DSLAM 328n is in communication with customers 330a-330n (collectively 330) that may access content available via the service provider server 208 that is delivered from the webserver 306, video on demand library and broadcast distribution server 314, or otherwise. The service provider server 208 may be configured to be a support hosted content or network broadcaster accounts so that a content provider can simply "drop" content onto the service provider server 208 and manage the content and delivery thereof to customers, such as customers 330, of the communications service provider with guaranteed QoS and the ability to target advertising to those customers.

Although shown as a single service provider server or network node 208, there may be multiple service provider servers 208 operating in a local geographic area that services subscribers of the communications service provider without having to access the Internet. To enable subscribers in a local geographic area to access the service provider server(s) 208 without accessing the Internet, the service provider server 208 is to operate at any level between the subscribers and the Internet 302. As other service provider servers are distributed within different geographic regions, a network of service provider servers capable of serving subscribers in regional or national capacities is possible. As the service provider servers are more widely distributed throughout the country, the communications service provider is able to either provide advertisers with targeted advertising capabilities. In one embodiment, the communications service provider may maintain local airtime for selling advertising and provide the content providers with national airtime to sell advertising, or vice versa.

Airtime may be considered a display region on a webpage. Alternatively, airtime may be considered time during content (e.g., television show) during which advertisements are played (e.g., 5 minutes). The airtime may be apportioned nationally and locally, where national airtime is airtime that is allocated across each geographic region (e.g., California, Nevada, Ohio, Florida, etc.) in which the service provider services and local airtime is airtime in each individual geographic area (e.g., New York). The apportionment of the airtime may be contractually established between the communications service provider and the content provider. In one embodiment, the national airtime is allocated to the content provider, if operating in multiple regions and the local airtime is allocated to the content service provider. The reverse allocation is also contemplated in accordance with the principles of the present invention.

Figure 4A:
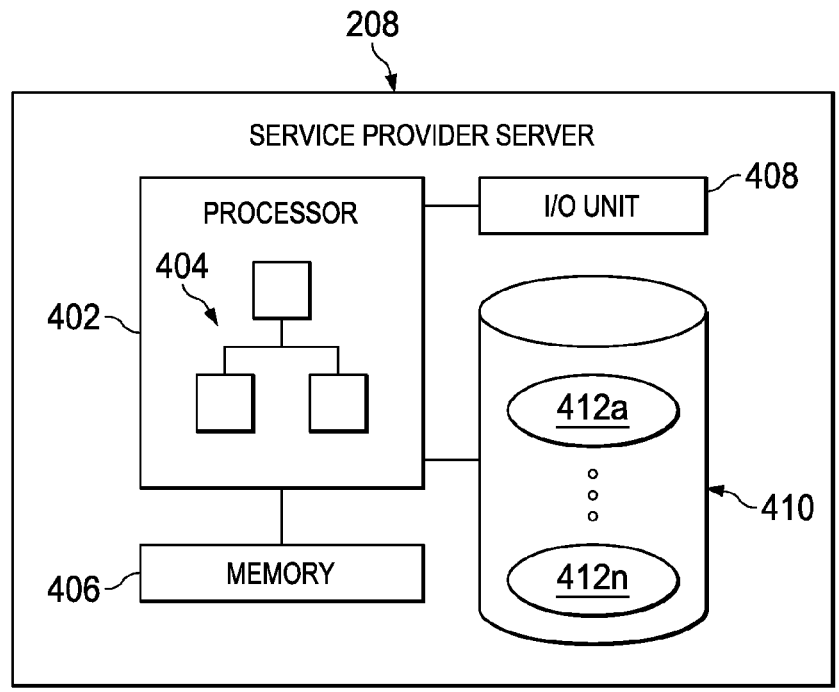
FIG. 4A is a block diagram of an illustrative service provider server configured to enable a content provider to store and distribute content from a storefront of a content mall.

With regard to FIG. 4A, a block diagram of the service provider server 208 is shown to include a processing unit 402 that may include one or more computer processors that execute software 404 to provide for content management and distribution functionality in accordance with the principles of the present invention. The processing unit 402 may be in communication with a memory 406 that is used to store data and software, input/output (I/O) unit 408 that is configured to communicate data over a communications network using one or more communications protocols, and storage unit 410. The storage unit 410 may be configured to store data repositories 412a-412n (collectively 412) that may store content, customer data, customer (e.g., content provider) preferences, user or subscriber data, user preferences, and so on. The data repositories 412 may be databases, as understood in the art. In one embodiment, the service provider server 208 may be configured to host one or more content delivery systems of content providers. It should be understood that the term content delivery system is meant to encompass the storage and/or transport of video on demand content, pay-per-view content, and broadcast content (e.g., television broadcast content) as further provided herein. Other types of content, including interactive content, such as games, user generated content, website content, and any other content is contemplated by the principles of the present invention.

With regard to FIG. 4B, the software 404 of FIG. 4A may be embodied with a configuration of illustrative modules of FIG. 4B that are executed by the processing unit 402 of FIG. 4A. The software 404 along with other hardware (e.g., databases) and software may be considered a remote content management application, where the remote content management application is a prepackaged system for a content provider to use. A content mall administrative system module 414 may be configured to enable a communications service provider that is maintaining the service provider server 208 to perform certain administrative functions to manage operation of the service provider server 208. The communications service provider may control certain functionality using the content mall administrative system module 414, such as establishing billing capabilities for a content provider to track user viewing events and billing information. The system is set-up by the access network owner who sets up the content provider areas by establishing amount of memory partitioned for each content provider, establishing bandwidth for each content provider, setting up administrators for each content provider, setting up authorized users for each content provider, and so forth. The communications service provider may also use the content mall administrative system module 414 to oversee operations and limit functionality available to each of the content providers who are operating content storefronts or content stores in the content mall operating on the service provider server 208. Still yet, the module 414 may enable the communications service provider to limit type of content that content providers can distribute from the service provider servers to subscribers of the communications service provider or other users. Depending upon the type of presence or storefront agreement between the content provider and the hosted content mall, the content provider may have rights to create their own branded website, advertisements, and codecs with content controls or other lower level of content hosting functions.

A content provider control panel module 416 may be configured to enable a content provider to control operations of the service provider server 208. The content provider control panel module 416 may be executed to display a graphical user interface for a content provider to selectably control billing, content management, digital rights management, QoS, interactive customer functions, such as voting functionality, and so on. The content provider control panel module 416 may be configured to enable the content provider to control content distribution to subscribers of the communications service provider. In controlling the content distribution, the content may be limited to be distributed to subscribers that pay for premium content services, standard content services, or basic content services. Furthermore, the content may be made available to subscribers based on day and time.

A universal customer data repository 418 may be a data repository that is configured to store customer information that is generic in the sense that each customer or content provider has the same information that is to be managed in a data repository. For example, the universal customer data repository 418 may include a unique customer identifier, name, address, telephone number, business identifier, tax identifier, administrator name, and so on, of each content provider that is providing a content storefront or broadcast network.

The universal customer data repository 418 may further be configured to store information associated with each subscriber of a communications service provider local to a service provider server. Because the communications service provider may have detailed information about its subscribers or customers that are not to be shared with content providers or advertisers of the content providers, the universal customer data repository 418 may manage two different sets of data repositories, where a first set includes full details of subscribers and the second set is a "sanitized" version of the first set. Alternatively, the universal customer data repository 418 may include only the sanitized version. Still yet, the universal customer data repository 418 may include the full details and software may limit access to certain portions of the customer data repository 418 for targeted advertising and prevent unauthorized access to the content by a content provider or advertiser.

TABLES I and II are tables of illustrative subscriber information that may be maintained in the universal customer data repository 418. The information is shown to be very specific and include personal information (e.g., name, address, telephone number). However, when an advertisement is targeted to subscribers, the advertisement may be communicated to subscribers at specific physical addresses and/or subscribers that meet the advertiser's desired demographic information without providing the personal information to the content provider or advertiser. By not providing the content provider or advertiser with the personal information, the communications service provider may maintain anonymity for its subscribers, but provide the ability for content providers to sell advertising airtime to advertisers for a premium, thereby satisfying the subscribers, content providers, and advertisers' business desires. When content of the content provider is distributed to customer or subscriber 123456, the specific information of TABLE I may be prevented from being provided to the content provider or advertiser, while some or all of the information of TABLE II may be provided to either or both of the content provider and advertiser to allow for verification of the audience of the advertising. Other information associated with subscribers may be stored and used for determining whether or not to send certain advertisements to the subscribers.

TABLE I

Full Subscriber Information

| Cust. No. | First Name | Last Name | Addr. | City | St. | Zip | Ph |
|---|---|---|---|---|---|---|---|
| 123456 | George | Smith | 101 Main St. | Newton | MS | 39046 | 662 552-1234 |
| 234567 | Greg | Smith | 25 Oak St. | Los Angeles | CA | 93001 | 310 555-7890 |

TABLE II

Subscriber Demographic Information

| Cust. No. | Gender | Age | Birthday | Race | Yrs Subs. | Marital Status | No. of Children |
|---|---|---|---|---|---|---|---|
| 123456 | M | 62 | Mar. 30, 1960 | Cauc | 2 | M | 2 |
| 234567 | M | 40 | Jul. 14, 1966 | Cauc | 6 | M | 0 |

A billing/use database 420 may be configured to store billing and usage information that a content provider generates in its usage of the service provider server. The billing information may include information that users of the service provider generate by downloading content from the content provider, such as movies, games, or otherwise. The use portion of the billing/use database 420 may include information that shows the amount of storage space that is used by the content provider, the amount of data in megabits that is downloaded from the content provider, the amount of content that is added or deleted from a storefront, and so on.

A digital rights management module 422 may be configured to enable a content provider to manage digital rights management parameters. As understood in the art, digital rights management enables a content provider to limit access to the content by unauthorized users. In this case, the content provider may limit access to its content to users who are customers of the communications service provider that is providing the service provider server 208. Non-customers or subscribers of the communications service provider may be provided with limited access, but that access may be restricted to certain content that does not have guaranteed QoS. The content provider may define or set parameters for the DRM using the DRM module 422 via the content provider control panel module 416 based on geographic location, demographics (e.g., age), or any other parameter, as understood in the art.

A QoS module 424 may be configured to enable the content provider to establish QoS guarantees for some or all of the users that request download of content. The QoS module 424 may enable the content provider to set a minimum guaranteed QoS based on QoS parameters, including delay, bit error rate, and so forth.

A content provider customer window module 426 may be configured for a content provider to define window operations for customers of the content provider. The window (i.e., graphical user interface) may be used to enable customers or users of the content provider to access certain content and perform certain functions, such as voting, if available in association with the accessed content.

A number of different data repositories may be included on the service provider server 208, including a set-top box software bin 428, player codec bins 430, advertising bins 432, and content bins 434. The set-top box software bin 428 may include software that is to be downloaded to a universal set-top box or proprietary set-top box to enable the user of the set-top box to interface with the content mall or storefront of the content provider. In one embodiment, the set-top box software bin 428 may enable each content provider to add its own software for proper set-top box operation. The player codec bins 430 may be configured to store codecs that may be used to code and decode content being downloaded or delivered by the service provider server 208 when communicating to a user using a set-top box or computer, for example. As understood in the art, each company with its own set-top box, game console, or other device that is used to communicate over a communications network generally has a codec and often has a codec that is proprietary for use on the device provided by the company. In accordance with the principles of the present invention, rather than each user having to have a separate box for accessing content in different content storefronts in the content mall, each content provider may simply add a codec to the player codec bins 430, thereby allowing users to have a single set-top box or other user interface and access content being provided by different content providers operating a storefront in the content mall.

The ad bins 432 may be a storage repository that enables a content provider to store ads that are to be inserted or distributed with content being downloaded or otherwise communicated to customers or users that desire content of the content provider. The ad bins 432 may be configured to store local or national ads that are to be distributed either locally or nationally. For example, the content provider may have storefronts in multiple regions throughout the country, thereby enabling an advertiser to display ads at each of the geographic locations in which the content provider is operating. These ads may be considered national ads and local ads that are communicated to each individual geographic area in which the content provider is operating a storefront may be stored in a different area in the ad bins 432. These local ads may be distributed locally based on specific geographic locations of users that may be available to the content provider by the communications service provider. In one embodiment, the specific geographic locations of the users may not be made available to the content provider, but the ads may be distributed based on the specific geographic locations of the users.

Content bins 434 may be configured to store different types of content that the content provider may make available to users. The content may include movies, television shows, sporting events, special programming, adult content, or any other content that is non-real time content. As will be described hereafter, content may alternatively be broadcast content in which the content is distributed on a programming or live basis. For example, a television network may broadcast television shows at certain times and the broadcast content (e.g., television shows) is to be routed or streamed without being stored for any significant period of time by the content provider. The content stored by the content provider may operate more like video on demand or pay-per-view for users to select and download.

A customer interactive request and voting system module 436 may enable a customer such as a content provider, to set up request and voting functionality. Voting may include enabling users to vote on images or requests that are made in the content (e.g., best singer), order information displayed in the content (e.g., infomercial offerings), polls made in the content (e.g., favorite actress), or otherwise. The customer request and voting system module 436 enables the content provider to set-up, synchronize, or otherwise design voting, polling, betting, or other requests made using graphical user interface technology, for example. The voting system module 436 may be configured to tabulate and, optionally, notify users of current voting results on a real time basis.

A voting database 438 may be configured to store votes that the content provider makes available for users to submit. The voting database 438 may be configured to store one or more databases associated with one or more voting requests for the same or different content. The voting database 438 may be capable of being sorted, tabulated, totaled, or other statistic by using the content provider control panel module 416 or customer request and voting system module 436.

A user control panel module 440 may be configured to enable a user to set-up or select certain desired functionality or preferences for using the content storefront of the content provider. The user control panel module 440 may provide the user with the ability to select certain aspects of access to the content being provided by the content provider, including limiting access to certain members of a family (e.g., underage children), the amount of bandwidth that is available for download of content to a residence of the user, access to the content during certain times of the day, and so on.

A content control settings module 442 may be configured to manage content control settings. The content control settings module 442 may enable a content provider to manage content that the content provider stores at the content mall in the content bins 434 through the use of a predefined graphical user interface. The content control settings may include defining types of content, such as video on demand, HD content, pay-per-view content, gaming content, and so forth. The content control settings may also include limiting the size of the content, channels on which the content are to be made available, setting ratings of the content, restricting times that the content can be displayed, etc.

An ad control and selection system module 444 may be configured to enable a content provider to control advertising content for delivery or insertion or communication with certain content, such as advertising for children to be inserted into cartoons, adult advertising to be included in movies rated R, or other appropriately associated advertising. The ad control and selection system module 444 may also allow a content provider to set geographic areas that ads are to be displayed, times and dates for ads to be displayed, and other ad selection or restriction preferences. The ad control and selection system module 444 may also be configured to handle the process of selecting specific ads to send to subscribers based on their specific address and/or demographics. If the content provider is distributing national advertisements for advertisers, then the module 444 may not distinguish between specific addresses of subscribers, but rather be configured to distribute a certain number of ads (e.g., three ads to the same subscriber over a certain time period) to each different subscriber. The module 444 may further be configured to select ads based on time of day, ad preferences selected by subscribers, or any other information associated with subscribers and/or ads. In one embodiment, the module 444 may generate a report for content providers and advertisers to view, where the report includes a listing of ads, number of times downloaded or communicated with the content, demographics of subscribers, and other relevant information to the content providers and advertisers.

An ad administration system module 446 may be configured to enable a content provider to manage types of ads that are being stored in the ad bins 432, content that the ads are being associated with, or otherwise manage the size and length of advertisements that are being stored in the ad bins 432. The ad administration system module 446 may further be configured to limit the information of the subscribers being made available to the content providers or advertisers. In one embodiment, the ad administration system module 446 may present a GUI that enables the communications service provider to select what, if any, information, such as demographic information, that the content provider and/or advertisers may view. The module 446 may further be configured to perform the same or similar functions as the ad control and selection system module 444, where ads may be selected based on specific locations and/or demographics of the subscriber if the communications service provider is operating to distribute local or targeted ads to subscribers. If the communications service provider is operating to distribute national ads, then the module 446 may be configured to distributed ads to different subscribers a given number of times over a given time period (e.g., 3 of the same ad per 24 hours).

Although shown as a single remote content management application, it should be understood that multiple remote content management applications may be operating on a single service provider server to provide content management and distribution services to multiple content providers. If multiple remote content management applications operate on a single service provider server, certain aspects of the service provider server may be shared, such as memory, disk space, databases, processors, and so forth. Each remote content management application is to provide guaranteed QoS for content distribution to subscribers local to the service provider server. The remote content management application provides control of content by content providers, control of content distribution, the ability to manage advertising content being distributed with the content, guaranteed QoS, and other features, as described herein.

Figure 5A:
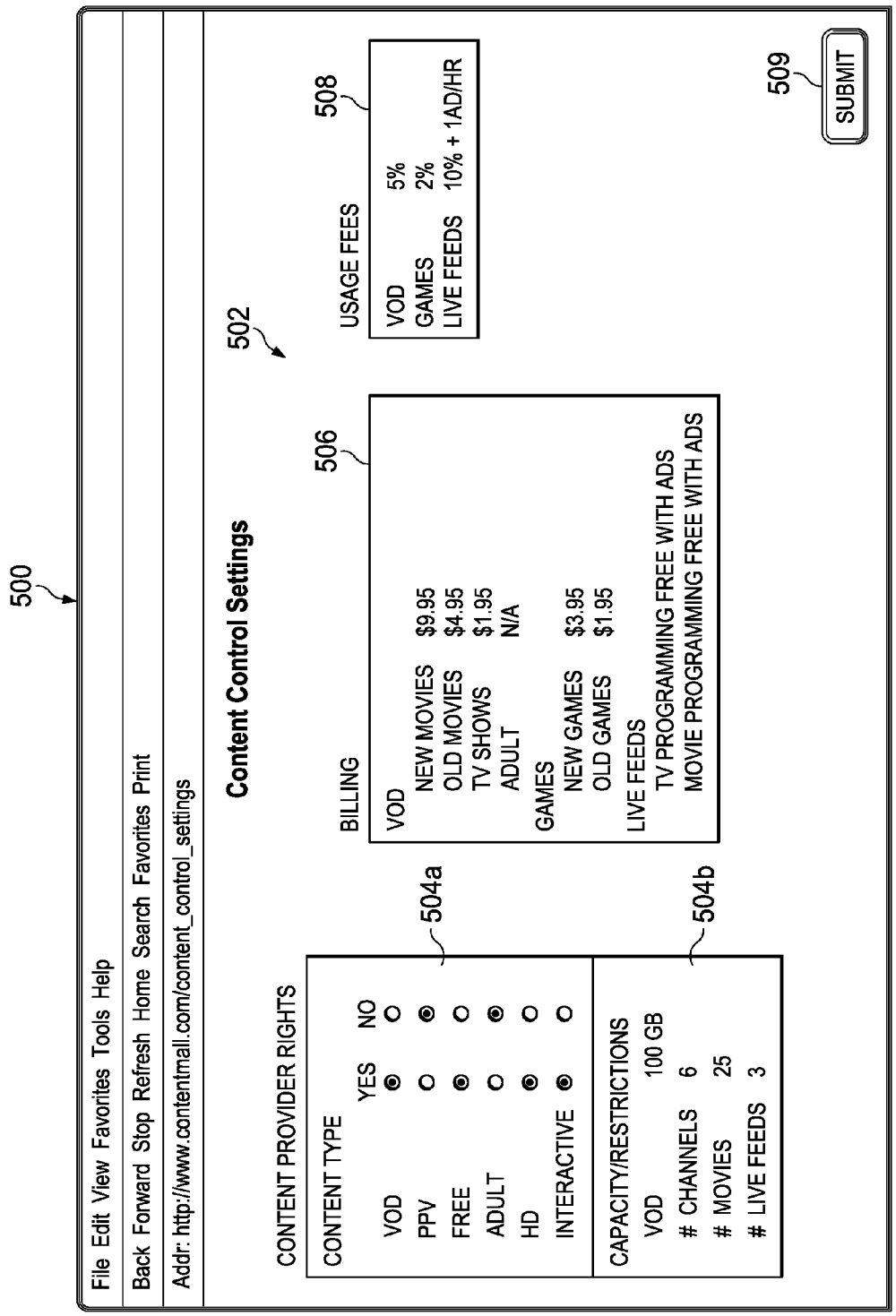
FIG. 5A is a screen shot of a content control settings graphical user interface configured to enable a content provider to control content being distributed from a webserver to subscribers of a communications service provider.

With regard to FIG. 5A, a browser window 500 is shown to include an illustrative graphical user interface to enable a content provider to manage content control settings. The content control settings may include content provider rights that allow for the content provider to set content type rights 504*a* and capacity/restrictions 504*b*. The content type rights 504*a* may include a list of content types, such as VOD, PPV, free, adult, HD, and interactive. The content provider may select "yes" or "no" to set or not set the different content types that the content provider is able to post on the content storefront. In one embodiment, a communications service provider may establish the different content types that the content provider is able to selectively post on the storefront in the data mall based on a variety of factors, including amount of money paid, particular data mall, contract terms, and so on.

The capacity/restrictions 504*b* may include a number of different parameters, including VOD storage capacity, number of channels, number of movies, and number of live feeds. The number of channels may be established as a total number of channels that the content provider is to have available for communicating content, the number of movies is the total number of movies that the content provider may store at the store front, and the number of live feeds is the number of channels that the content provider desires to use for distributing program content, such as live sporting events, programmed television shows, and so forth. It should be understood that other parameters, such as number of channels with high definition, number of channels with pay-per-view, etc., may be provided as well.

A billing region 506 may enable a content provider to set pricing for different content. For example, video on demand new movies may be set a $9.95, old movies at $4.95, new games at $3.95, and live feeds for TV programming is free with ads and movie programming is free with ads. Each of the prices or agreements (e.g., free with ads) may be pre-established in a selectable menu for the content provider to select. For example, other selectable options may include "fixed price without ads," "fixed price per MB," or other fee arrangement between the content provider and communications service provider. Because the content provider is able to control prices for its own content, pricing can be controlled by the content provider in creative and/or progressive ways. For example, the content provider may create rules for pricing that set special low prices for the first number of downloads (e.g., $2.95 for first 1,000 downloads) or downloads within a certain timeframe (e.g., within first 24 hours of posting). Furthermore, the content provider may offer discount coupons that can be applied for downloading the content. Because the content provider maintains control of the content and distribution thereof, the content provider can be more aggressive with marketing and pricing of the content, as opposed to other distributors that do not have the same motivation to sell or distribute the content of the content provider.

A usage fees section 508 may be simply a notification from the communications service provider to the content provider of the usage fees that the content provider is to pay for use of a storefront in the data mall. The usage fees shown include VOD at 5%, games at 2%, and live feeds at 10% plus one ad per hour that the communications service provider is able to sell and collect fees from advertisers. Other usage fees arrangements may be set, such as fixed price per megabyte, fixed price per download, fixed price per content feed, fixed price per channel, variable prices, or any other arrangement that a communications service provider and content provider may agree upon. In an alternative embodiment, the various options of usage fees that the communications service provider is willing to accept may be selectable by a content provider in the usage fees region 508 through use of a pull-down menu or other selectable graphical user element. Once the content provider has established desired content control settings, the content provider may select a "submit" softbutton 509 for acceptance.

With regard to FIG. 5B, a screenshot of an illustrative graphical user interface 510 showing a content provider control panel is provided. The content provider control panel may include a number of different regions 512, 514, 516, and 518 that are used to enable a content provider to control certain aspects of a content storefront. A DRM region may enable the content provider to establish digital rights management for different types of subscribers, including pay subscribers, non-pay subscribers, set-top box customers, and web customers, for example. The content provider may select from a number of different radio soft-buttons 513 or other graphical user element that enable the content provider to turn on or off digital rights management for each type of content available for distribution by the content provider.

A billing region 514 enables the content provider to establish certain types of billing for each of the types of content that the content provider makes available to users. The billing region 514 may work in conjunction with the billing region 506 of FIG. 5A. In an alternative embodiment, the different billing regions 506 and 514 may be combined to enable the content provider to set billing type and rates simultaneously.

A channels region 516 may enable a content provider to assign channels that the content provider has available for distributing or broadcasting content. As shown, the content provider has 12 channels on which to distribute content. Channels 1-4 are assigned to distribute video on demand (VOD) content, channels 5-7 are assigned to distribute broadcast content, where the broadcast content is content that is pushed to users due to being programmed or broadcast live, channels 8 and 9 are assigned to pay-per-view (PPV) content, channels 10 and 11 are assigned to time-shifted content (e.g., reruns of television shows), and channel 12 is assigned to distribute games (e.g., Super Mario®). Because the content provider maintains control over the content, as opposed to a communications service provider or content distribution network having control of the content owned by the content provider, the content provider may establish the type of content being distributed on each channel.

A special events region 518 may be configured to enable a content provider to establish special events that are to be distributed on particular channels. Because the events are time sensitive if pre-recorded and later broadcast, the content provider may limit a time and date as to when the special events may be broadcast or otherwise distributed to users. Once the content provider has established digital rights management, billing, channels, and special events, for example, the content provider may select a submit soft-button 519 for acceptance and storage of the selections.

With regard to FIG. 5C, a screenshot of an illustrative graphical user interface 520 for a communications service provider control panel is presented. The communications service provider may be the provider that makes available the service provider server on which the content provider may establish a content storefront in a data mall available to multiple content providers for operating storefronts. The graphical user interface may include a capacity region that enables the communications service provider to establish an amount of storage capacity that the content provider has available for storage of different content. The amount may be established based on a service contract between the communications service provider and content provider. As shown, a television network may have 100 gigabytes (GB) of storage available and will be notified of storage space limitations when less than 10 gigabytes are available. In an alternative embodiment, rather then using a fixed number of storage, notification parameters may be established based on percentages, such as 25%, 10%, and 5%. In addition, the communications service provider may establish a partition for an amount of high definition content, standard definition content, and other content. Movie studios may be provided more storage space than television networks due to movie studios having larger amounts of content in the forms of movies. A content aggregator, which is a content provider that aggregates content from multiple different sources (e.g., television networks and movie studios) and distributes the content as an online content network, for example.

Distribution parameters may be established that limit the distribution channels based on how much money each content provider is willing to pay. For example, a number of channels may be established, where each channel costs a certain amount of money, and bandwidth per channel may be established, again, based on how much money the communication service provider is willing to pay. In one embodiment, a minimum number of channels and minimum bandwidth per channel may be provided to each content provider that has a content storefront with the communications service provider for a fixed or variable price, and the content providers may purchase additional channels or higher bandwidth per channel, thereby having a larger presence and more convenient usage for users. Different types of channels may cost different amounts. Broadcast channels may cost more, but not have storage fees associated with the broadcast content due to the broadcast content being fed and rebroadcast from a service provider server hosting the content storefront.

A stats region 524 may enable a communications service provider to collect or not collect certain statistics for operation of a content storefront. The statistics may include capturing the number of downloads, monitoring browsing of content, monitoring the number of visits of different users, monitoring a number of preview views by users, monitoring number of full views, monitoring a last download of each available content, amount of time users spend browsing content, and so on.

A billing region 526 may be configured to enable a communications service provider to establish minimum billing requirements for content providers who have storefronts. The billing requirements may include video on demand minimum billing rates, pay-per-view minimum billing rates, and broadcast minimum billing rates. By establishing minimum billing rates, the communications service provider can, in effect, establish a minimum amount of revenue that the content provider is to pay the communications service provider using a percentage based billing arrangement. In an alternative embodiment, the billing arrangement may provide the communications service provider with a certain amount of airtime, such as commercial airtime, that the communications service provider may have for each piece of content or over a certain duration (e.g., on a per hour basis). In one embodiment, the billing arrangement may require that the communications service provider have a certain number of advertisements for each content that is downloaded by users or the communications service provider may require that one or more time slots (e.g., 30 seconds of airtime) on a periodic basis (e.g., per hour or 24 hours) for advertising commercials may be allocated to the communications service provider.

An advertising region 528 may be configured to enable the communications service provider to establish advertising requirements that the communications service provider may be allocated. For example, each video on demand content may enable the content provider and/or communications service provider with the ability to insert ads into the video on demand content. For games, however, advertising may be preloaded or displayed prior to a user starting a game. If ads are inserted into content, the service provider server may be configured to select and insert advertising into ad segments that are made available within the content, as understood in the art. The ads may be inserted as national ads across all regions, regional ads across certain geographic areas (e.g., northeast), or local ads in specific geographic areas on servers serving subscribers in the geographic areas. Once the communications service provider has completed selection or establishment of parameters for controlling customer or content provider functional operation parameters, the communications service provider may select a submit soft-button 529 for submission and storage of the selected and established parameters.

TABLE III is a table of an illustrative listing of advertisements that are assigned to be displayed on certain dates and during certain times. The ads are also assigned to be displayed nationally or locally. If national, the ads are to be displayed in each region that a content provider has access to subscribers of the communications service provider. If local, the ads are to be displayed to subscribers of the communications service provider in specified geographic regions, such as area codes or street addresses, and, optionally, demographics. Other information, such as demographic information (not shown), for use in targeting the advertisements may be stored in the table and used for delivering targeted advertising. As previously described, specific information of the targeted subscribers to which the advertisements are communicated may not be provided to either the content providers or advertisers.

mall is shown. A content mall is representative of available content "storefronts" that are available in the content mall being hosted by one or more service provider servers in distinct geographic regions. The graphical user interface 602 shows a content mall with a variety of different content storefronts, including movie studios 604, television channels 606, sports networks 608, and independent networks 610. Other types of storefronts may similarly be available in the content mall. The movie studios may be storefronts of different movie studios that desire to distribute content to customers of a communications service provider that provide a service provider server with the ability to deliver a guaranteed QoS and enable the content providers (e.g., movie studios) with the ability to provide targeted advertising to the customers of the communications service provider. Each of the content providers is able to deliver content into content bins 434 (FIG. 4B) over which the content providers are able to maintain control. The control is in the form of digital rights management, distribution control, timing control, advertising control, and other controls, as further described herein. In one embodiment, ad space at the content mall may include national ad space 612 and local ad space 614, where a content provider may sell the national ad spaces 612 and the communications service provider may sell the local ad space 614. In an alternative embodiment, the communications service pro-

TABLE III

Ad Listing and Targeting

| Ad Name | Ad Id | Content Association | Dates | Times | National/Local |
|---|---|---|---|---|---|
| Softdrink | A742F3 | Action Movies/Shows | Jul. 14-Jul. 21 | 8-10 am; 5-9 pm | National |
| Running Shoe | 8274D4 | Action Movies/Shows | Jul. 15-Jul. 22 | 5 am-9 am; 4-7 pm | National |
| Pizza Shop | C28472N | Sporting Events | Jul. 14-Jul. 21 | 4-10 pm | Local (75206) |
| Barber Shop | 717Z32T | All | Aug. 14-Aug. 21 | 8-12 pm | Local (02062) |

With regard to FIG. 5D, a screenshot of an illustrative graphical user interface 530 for a user control panel is shown. The user control panel may enable a user (e.g., consumer) to set-up controls that each individual of a subscriber household of the communications service provider may have when accessing content from the data mall. Login names 532 and associated passwords 534 may be established for users to enter when using the set-top box. For each of the users, ratings of content that are allowed to be downloaded may be selected by the user in region 536. In addition, ad categories 538 may enable a user to select ad categories that each of the users desires to view when watching content. For example, Briana Smith, who is a daughter of John and Lisa Smith, may be allowed to watch toy commercials when watching content being broadcast or downloaded from a content storefront on the data mall. In addition, game ratings 540 may be selected for available games that may be downloaded or played from the content mall. Once the user has selected the desired content ratings, ad categories, and game ratings, the user may select a submit soft-button 541 for acceptance and storage of the selected preferences.

The preferences, requirements, elections, and otherwise provided to each of the communications service provider, content providers, and users in FIGS. 5A-5D are meant to be illustrative in that alternative options and configurations may be available. The webpages provided for each of the different users may be significantly more extensive to provide for a variety of different controls that establish rules, billing requirements, fee requirements, and so forth.

Figure 6A:
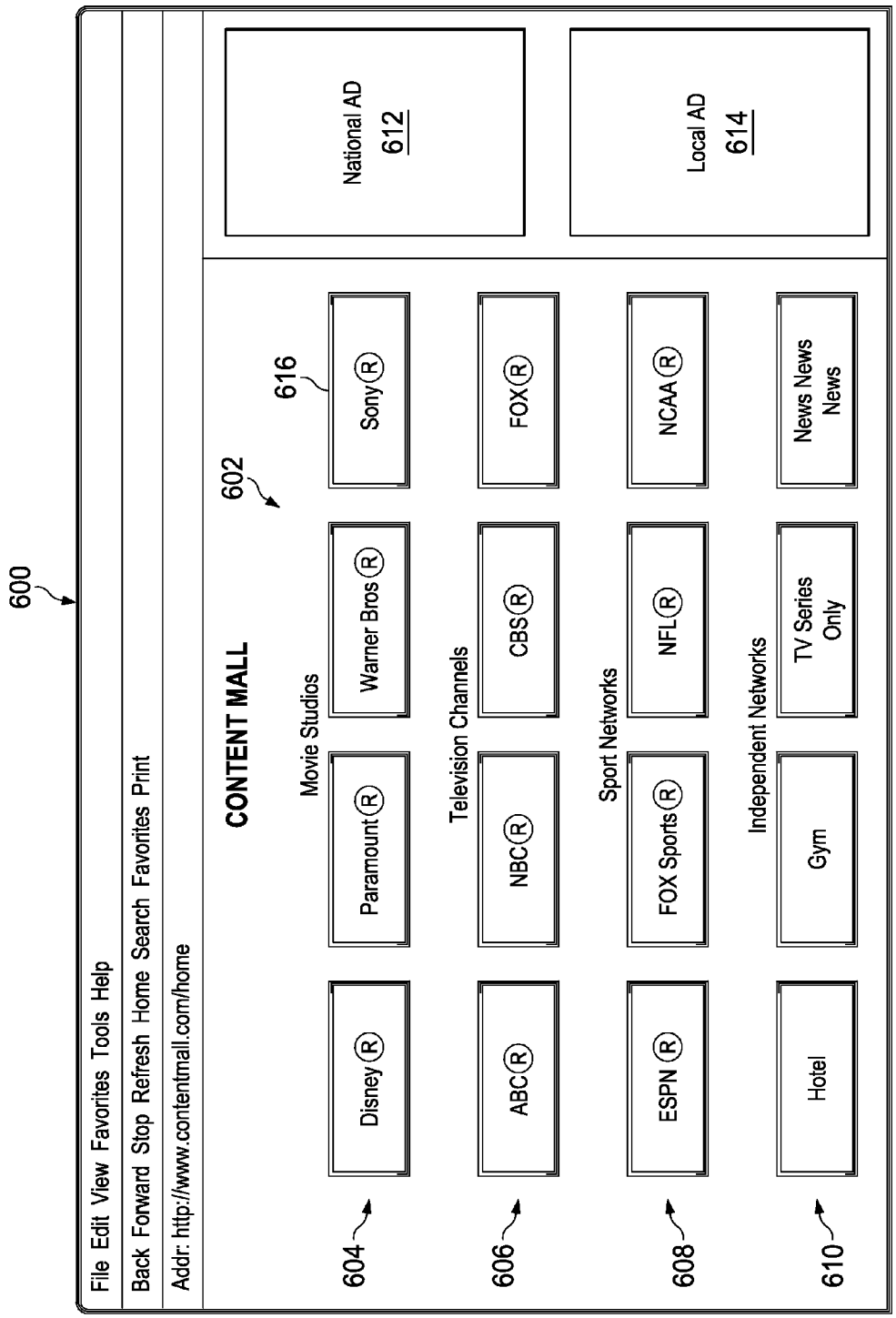
FIG. 6A is a screen shot of an illustrative graphical user interface of a content mall that multiple content providers may distribute content to subscribers of a communications service provider in accordance with the principles of the present invention.

With regard to FIG. 6A, a screenshot of a web browser 600 showing an illustrative graphical user interface of a content vider may be able to sell both the national and local ad space 612 and 614. Because the communications service provider knows the geographic location at which the service provider server operating the content mall services, a local ad that is relevant to users in a certain geographic region may be displayed in the local ad space 614. For example, surf board ads may be displayed in California and Hawaii and snow blower ads may be displayed in northern states.

A user, such as a subscriber of the communications service provider, may visit the content mall and decide to enter content storefronts being provided by the different content providers. In one embodiment, a hotel chain may choose to create their own broadcast distribution network using a composite of other broadcast and VOD content provided by other content providers and available on the system. While the different content providers tend to cross-sell content to the other content providers for distribution over television networks, the content providers may elect to maintain their own content for distribution at the content mall. However, in an alternative embodiment, the content providers may allow the independent networks 610, such as the TV Series Only or News News News Networks, on the content mall to distribute content. For example, the TV Series Only Network may be able to distribute television series, such as Get Smart, Seinfeld, or 24, in their season entireties. The News News News Network may be able to broadcast a large number of different news channels available via a single storefront. So, for example, the News News News Network may distribute U.S. news networks (e.g., ABC, NBC, CBS, Fox News, CNN, etc.) and foreign news, such as news from the Middle East, Asia, Europe, Australia, etc. By aggregating news from around the world, the News News News Network may inherently create a distinct brand that users come to appreciate and access when seeking a wide range of news sources.

Each of the different content providers with a content storefront may be displayed and be selected by a user. For example, a user may select a soft-button 616 of a Sony™ content storefront. In response to the user selecting the soft-button 616, another graphical user interface 618 (FIG. 6B) is presented to the user.

Figure 6B:
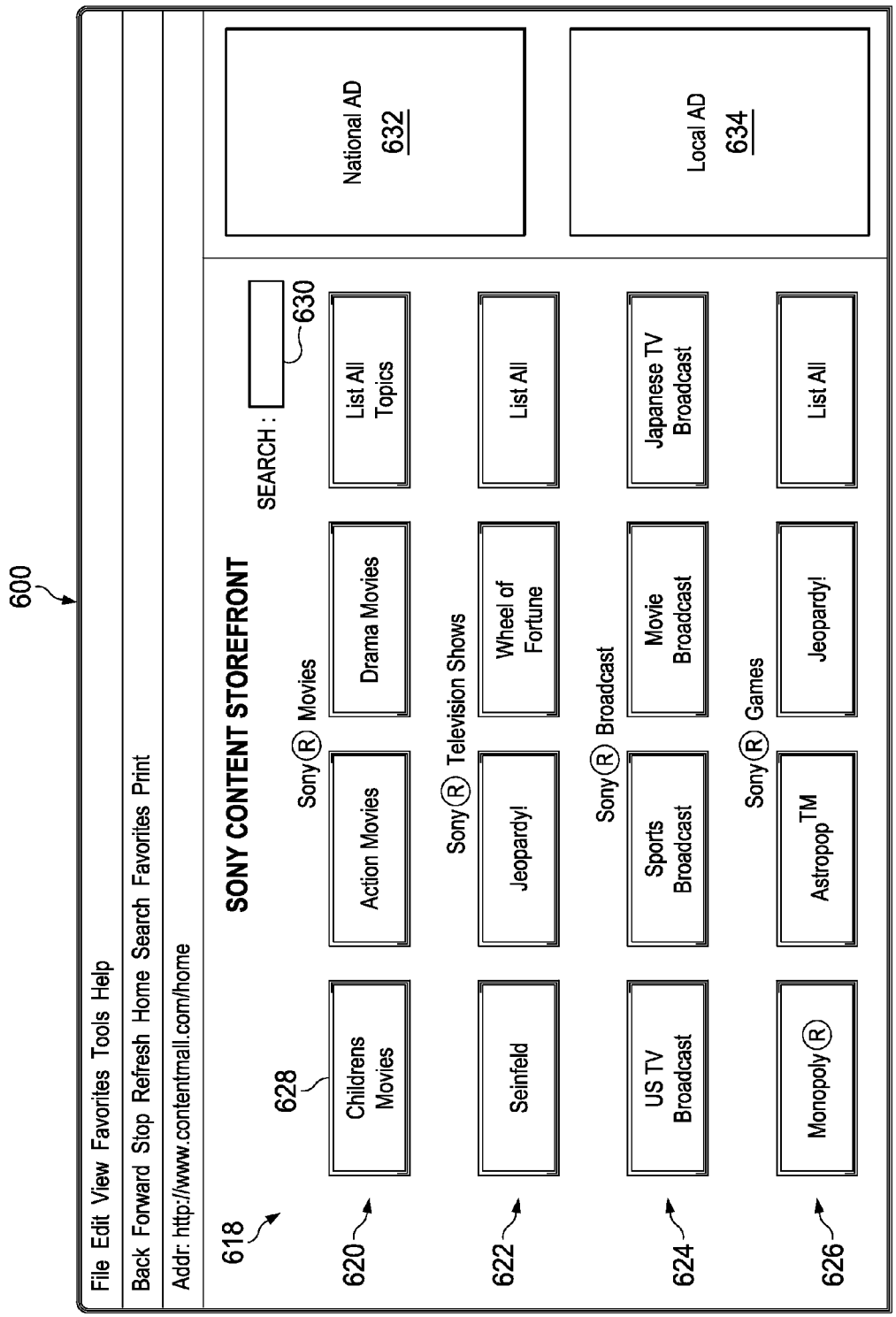
FIG. 6B is a screen shot of an illustrative graphical user interface of a storefront showing content available from a particular content provider, such as Sony®.

With regard to FIG. 6B, illustrative graphical user interface 618 is shown to include the Sony content storefront 618. The Sony content storefront 618 may include any content that Sony desires to make available to users of the communications service provider. The content may include movies 620, television shows 622, broadcast channels 624, and games 626. In one embodiment, each of the different content may be set up as a selectable soft-button that enables users to continuously "drill down" to find specific movies within a particular genre. For example, children's movies may be listed on a top level and more specific topics or actual movie listings may be shown in subsequent graphical user interfaces (not shown). For example, the children's movies soft-button 628, when selected, may cause another graphical user interface to be displayed that distinguishes animated movies from traditional films. Still yet, the movies may be categorized by action, adventure, comedy, etc. As shown, Sony has 16 different channels where four are movie channels, four are television shows, four are broadcast channels, and four are game channels. Other channel configurations may be utilized to make available the different content categories. The broadcast channels may be content that is programmed, such as conventional television. The other channels may be pay per view or on demand channels. A search text entry field 630 may enable a user to enter an actor name, movie title, television show title, game title, or any other alphanumeric entry that may be searched in the Sony content database.

A national ad region 632 and local ad region 634 may be displayed on the graphical user interface 618, where each of the national and local ad regions 632 and 634 are available to Sony as the Sony content storefront 618 is being viewed by the user. Alternatively, the communications service provider may maintain ownership of the national and local ad regions 632 and 634. In an alternative embodiment, the national and local ad regions 632 and 634 may be shared or otherwise partitioned in displays or airtime by the communications service provider and the content provider, in this case, Sony.

Figure 7:
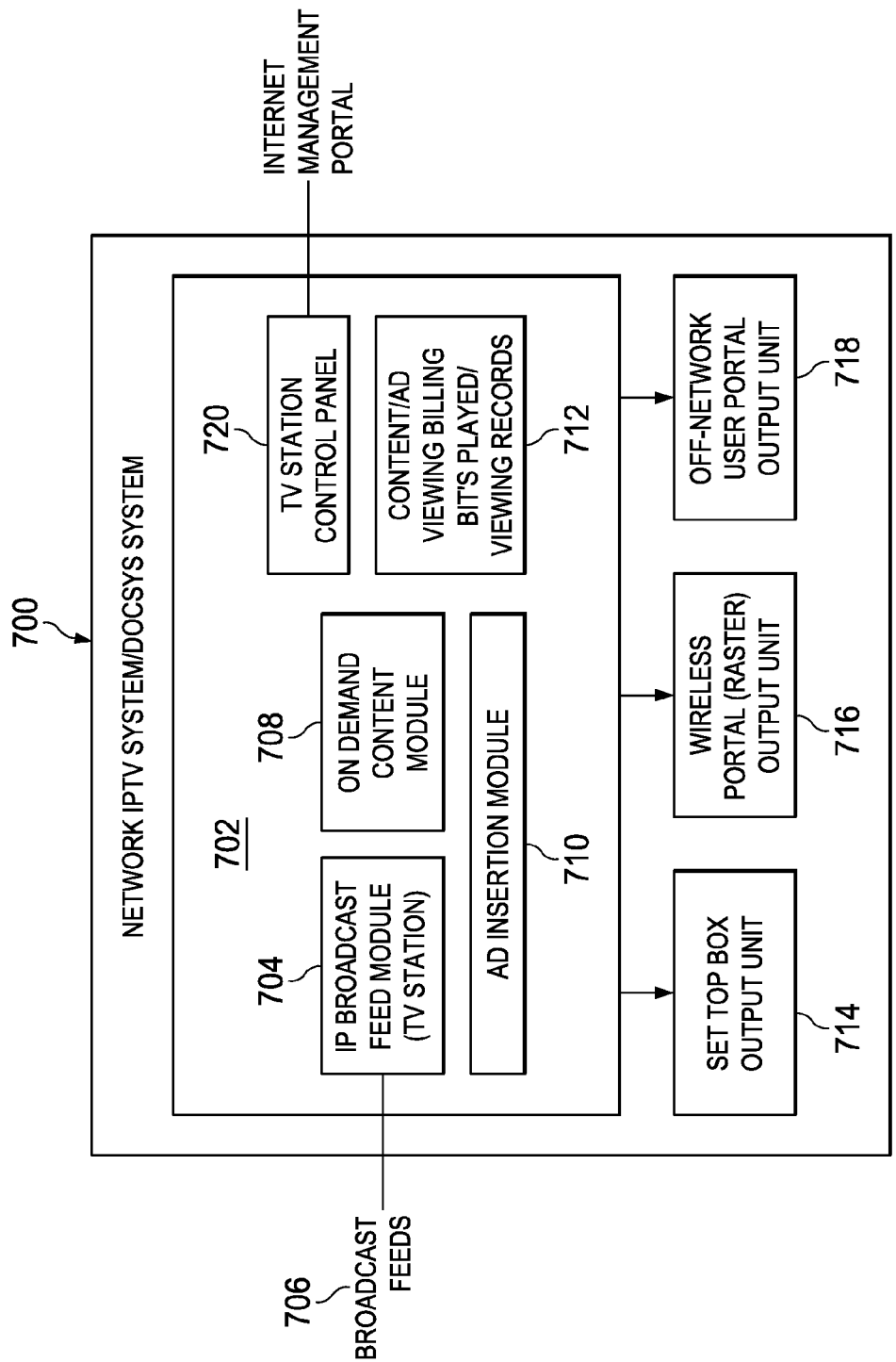
FIG. 7 is a block diagram of an illustrative service provider server configured with a network IPTV system that provides for a virtual television network.

With regard to FIG. 7, a block diagram of an illustrative service provider server 700 is shown to include a network IPTV system that operates as a "television network in a box" to enable a content provider or television network to run a virtual television network from the service provider server. A virtual television network is a television network that operates in a "Centrex-like" manner in that the content provider or television network does not have television distribution equipment within their own facility, but rather operates the television network from the service provider server located on a communications network, in this case, in a service provider server. By providing a "television network in a box" system solution, overhead for television networks may be substantially reduced, thereby enabling independent television networks to compete with traditional television networks as the content that the independent television network distributes may be licensed or otherwise repackaged for distribution to subscribers of the communications service provider in a targeted manner.

As was described with respect to the service provider server 208 of FIGS. 2-4B, the service provider server 700 may be provided with the ability to deliver content with guaranteed QoS. The network IPTV system 702 may include a number of modules, which may be hardware and/or software modules that provide for IPTV broadcast, on demand content communication, pay-per-view communication, games or interactive content communication, and so forth.

An IP broadcast feed module 704 may be configured to receive broadcast feeds 706 via a communications network, such as the Internet, satellite, RF network, or any other network that is capable of communicating broadcast content for redistribution to users of the communications service provider. The IP broadcast feed module 704 may operate to distribute one or more broadcast feeds to users via one or more broadcast channels, as described with regard to FIG. 6B.

An on demand content module 708 may be configured to deliver content using on demand type delivery, where users may selectively download the content. The broadcast feed content being broadcast by the IP broadcast feed module 704 is not the same as on demand content, as broadcast content is live or otherwise scheduled so that a user may view the content being broadcast in a "push" manner.

Ad insertion module 710 may be configured to insert advertisements in the broadcast content or on demand content either between segments of the content or at the front end or back end of the content. In an alternative embodiment, the ad insertion module 710 may communicate the ad content to be delivered in parallel with the broadcast or on demand content to be displayed in a separate window. The ad insertion module 710 may be configured to manage a playlist of content and ad airtime, and further be configured to schedule the ads based on ad display time restrictions established by respective advertisers, day restrictions established by respective advertisers, and geographic and/or demographic restrictions established by respective advertisers.

A billing module 712 may be configured to track content and ad viewing history to enable the communications service provider to track how much content is being downloaded or broadcast to users of the communications service provider, thereby enabling the communications service provider to accurately track billing information for content providers. The billing may be determined as a function of the number of bits that are distributed or broadcast from the service provider server 700, the amount of airtime for the ads, the price per ad segment, or any other manner as understood in the art.

Because the service provider server 700 may be configured to operate as a television network, but a television network that operates online that is capable of distributing content to different types of devices via different communications network channels, the service provider server 700 may include a set-top box output unit 714, wireless portal (raster) output unit 716, and off-network user portal output unit 718. The set-top box output unit 714 may be configured to distribute content to a set-top box at a user. The set-top box output unit 714 may include a codec that is standard or proprietary to the content provider. The set-top box at the user may have a corresponding standard or proprietary codec to be able to receive and decode the content being distributed by the content provider. The wireless portal (raster) output unit 716 may be configured to rasterize content, which means that the content that would otherwise be formatted for a television would be converted to be able to be viewed on a mobile telephone or other wireless device, as understood in the art. The off-network user portal output unit 718 may be configured to distribute content via the Internet and may be converted into an IP format for communication thereof. The set-top box output unit 714 and/or wireless portal (raster) output unit 716 may both be configured to distribute content using a guaranteed QoS, which means that the content will be tagged to ensure that the content is distributed with a certain guaranteed bit-error-rate, delay, and any other QoS parameter that ensures a user has guaranteed high-quality viewing of the content. The off-network user portal output unit 718 is to deliver the content over the Internet, so QoS is not guaranteed, but rather a "best efforts" communication is provided for content being communicated from the off-network user portal output unit 718.

Figure 8:
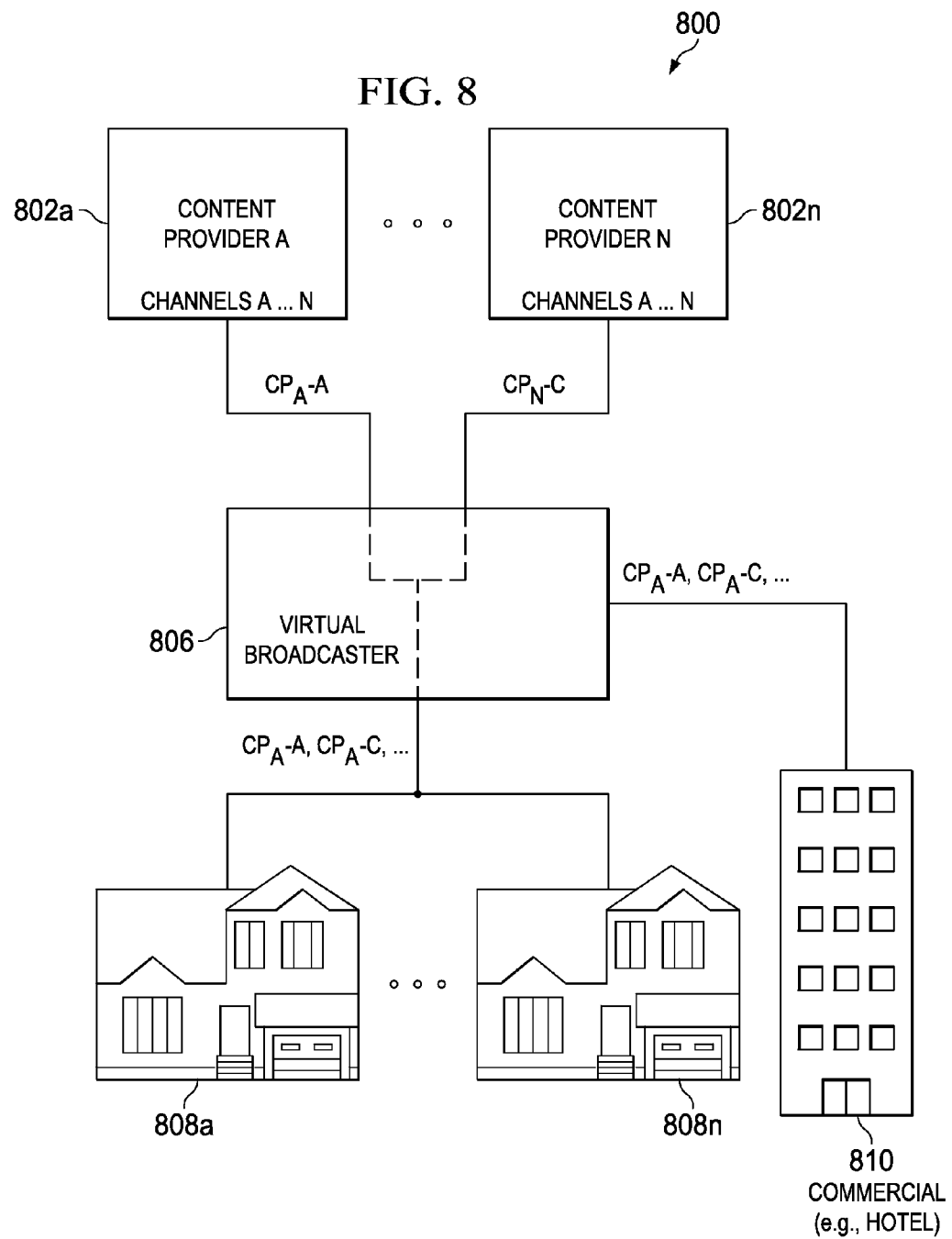
FIG. 8 is a block diagram of an illustrative network environment that enables a virtual television network to repackage broadcast television channels from content providers.

With regard to FIG. 8, a block diagram of an illustrative network environment 800 is shown to include content providers A-N 802a-802n (collectively 802). In one embodiment, the content providers 802 are operating on a network IPTV system 702, such as that is shown in FIG. 7. Each of the content providers 802 may have multiple channels (e.g., channels A-N) that are being delivered by each of the content providers 802. It should be understood that the content providers 802 may each have a different number of channels that are configured as broadcast channels. In an alternative embodiment, the content providers 802 may be operating using traditional communications broadcast equipment and be feeding the communications channels to be accessible to a virtual broadcaster 806. The virtual broadcaster 806 may be using a network IPTV system, such as that shown in FIG. 7.

A communications service provider that is managing the network IPTV system may configure the network IPTV system in such a manner that the virtual broadcaster 806 may selectively received content feeds from each of the content providers 802. As shown, the virtual broadcaster 806 may select content channel A from content provider A ($CP_A$-A) and content channel C from content provider N ($CP_N$-C). The virtual broadcaster 806 may, in essence, customize content available from the virtual broadcaster 806 by rebroadcasting or repackaging the selected content from the content providers 802. Users 808a-808n, who may be subscribers of the communications service provider, may access the selected content being broadcasted by the virtual broadcaster 806. The virtual broadcaster 806 being a repackager of broadcast content may brand the repackaged content under the virtual broadcaster's brand (e.g., News News News Network). It should be understood that the broadcast content is content that is being broadcast, such as a television channel on CBS™, NBC™, ESPN™, HBO™, and so on, on a real-time or programmed basis. In one embodiment, each of the content providers 802 and virtual broadcaster 806 may all be operating in a network IPTV system 702 on the same service provider server. This means that each of the content providers 802 may be communicating broadcast feeds to the service provider server, thereby enabling the service provider server to simply map the selected broadcast feeds by the virtual broadcaster 806 from the content providers 802.

Figure 9:
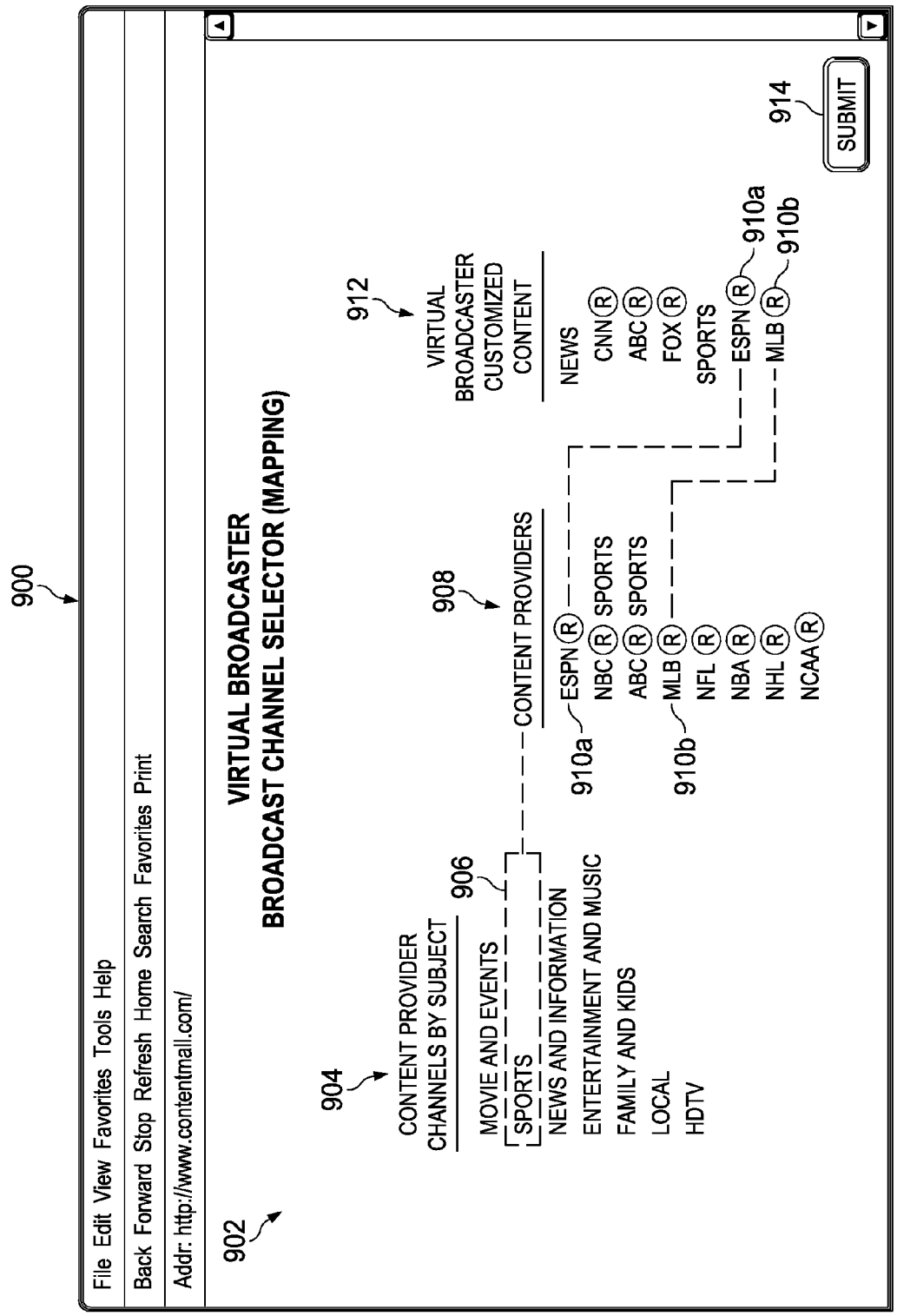
FIG. 9 is a screenshot of a graphical user interface that enables a virtual broadcaster to select broadcast channels from other content providers to broadcast from a virtual IPTV network.

With regard to FIG. 9, a browser 900 is shown to be displaying an illustrative graphical user interface 902 that enables a virtual broadcaster to select broadcast channels from other virtual broadcasters. In one embodiment, a listing of content provider channels by subject matter enables a virtual broadcaster to select what subjects to have mapped to its own broadcast channels. Alternative configurations, such as alphabetical listing by content provider, may be utilized to enable virtual broadcasters to select broadcast content for inclusion in the virtual broadcaster's broadcast channels. As shown, the virtual broadcaster may select sports 906 as a subject to view available sports channels available to be viewed as a list 908 of content providers that display sports channels. As shown, the virtual broadcaster may select from among the listed sports channel content providers for inclusion on the virtual broadcaster's customized content as shown in list 912, which is represented by subject and channels. The selected sports channels 910a and 910b are mapped into the list of sports channels for the virtual broadcaster. Once the virtual broadcaster has selected broadcast channels for mapping onto its own customized broadcast selection for users to select and view, the virtual broadcaster may select a submit soft-button 914 for storing the selected broadcast channels.

Figure 10:
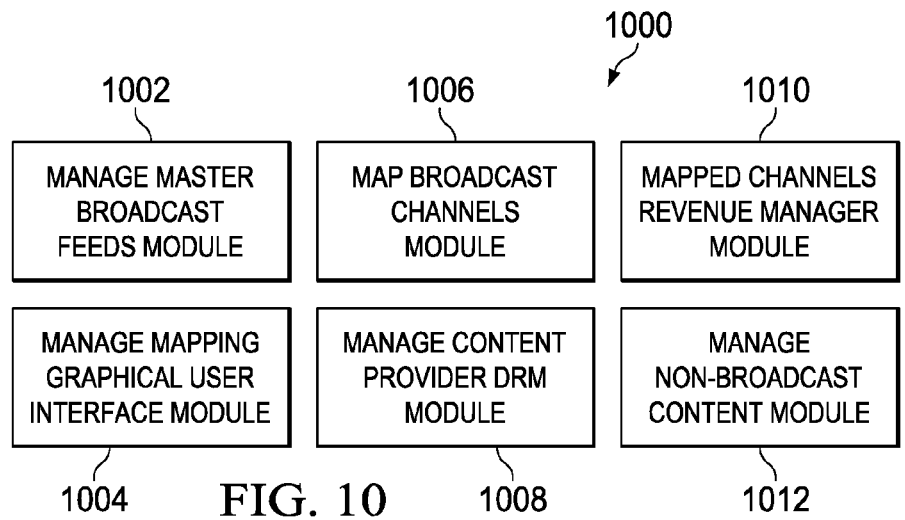
FIG. 10 is a block diagram of illustrative software models configured to provide virtual IPTV network channel mapping functionality.

With regard to FIG. 10, a block diagram of an illustrative set of software and/or hardware modules that may be executed on a service provider server for use in managing and mapping broadcast channels and other content is shown. The modules 1000 may include a manage master broadcast feeds module 1002 that it is configured to manage all broadcast channels that each broadcaster makes available for distribution to other virtual broadcasters. The manage master broadcast feeds module 1002 may manage broadcast feeds in association with specific content providers, feeds for other virtual broadcasters to map the broadcast channels to its own broadcast network, and any other information that may assist the service provider in tracking broadcast feeds.

A manage mapping GUI module 1004 may be configured to provide a virtual broadcaster with a GUI, such as GUI 902 of FIG. 9, to enable the virtual broadcasters to map available broadcast channels to a virtual broadcaster that selects from any list of available broadcast channels. The manage mapping GUI module 1004 may be configured to display available broadcast channels or feeds being managed by the manage master broadcast feeds module 1002. The manage mapping GUI module 1004 may be configured to track digital rights management assigned to each broadcast channel by each content provider to make available or not make available each broadcast channel to virtual broadcasters who desire to select available broadcast channels from its own virtual broadcast network.

A map broadcast channels module 1006 may be configured to map the selected broadcast channels from one virtual broadcaster to another. In mapping the broadcast channels, the map broadcast channels module 1006 is to perform the mapping from a broadcast feed to each of the virtual broadcast network that have requested that broadcast feed via the broadcast channel selector GUI (FIG. 9) and preserve guaranteed QoS for each of the mapped broadcast channels.

A managed content provider DRM module 1008 may be configured to enable a content provider to manage digital rights management of broadcast content for each of the broadcasters. In managing the DRM for each of the broadcasters, each broadcaster may limit what other virtual broadcasters may rebroadcast the broadcast content. For example, a broadcaster, such as NBC™, may not want its broadcast content to be broadcast by other virtual broadcasters that offer adult content. The content provider may also require that any virtual broadcaster that is to broadcast its content have a certain minimum revenue threshold that it exceeds to ensure that the content provider will be adequately compensated for redistribution of its broadcast content. Other limitations that the content provider may impose for other virtual broadcasters to broadcast its broadcast content may be imposed and managed by the mange content provider DRM module 1008.

A mapped channels revenue manager module 1010 may be configured to manage revenue that is to be paid to different broadcasters for broadcasting the other content providers' broadcast content. The module 1010 may be configured to accumulate revenue for a virtual broadcaster for when other virtual broadcasters rebroadcast its broadcast content and accumulate a total for each virtual broadcaster based on the amount of revenue each broadcast channel is generating. The module 1010 may further be configured to offset revenue if a virtual broadcaster is broadcasting virtual content from another virtual broadcaster, where the other virtual broadcaster is rebroadcasting the virtual broadcaster's content. In other words, if ESPN is rebroadcasting one of CBS' channels and CBS is rebroadcasting one of ESPN's channels, then, assuming the cost for rebroadcasting of each of these channels is identical, the revenue for each the virtual broadcasters will be offset, thereby resulting in neither channel owing compensation to the other channel. If a difference in price between the two channels exists, the difference in price is reflected by the module 1010. The module 1010 may further be configured to compensate the communications service provider with a percentage of the revenue as a broker fee from each of the broadcasters for providing rebroadcasting capabilities or a fixed broker fee for each channel or for providing the capabilities of having mapping capability for making available content for redistribution on a monthly basis.

A managed non-broadcast content module 1012 may be configured to manage non-broadcast content, such as video on demand, paper view, time-shifted content, or other content that is not considered to be broadcast content. The managed non-broadcast content module 1012 maybe formed of a number of modules as described with respect to the content store front (e.g., FIG. 4B). It should be understood that the modules 1000 are illustrative and other modules may be utilized in the same or similar manner as provided with regard to the content mall and/or storefront.

Figure 11:
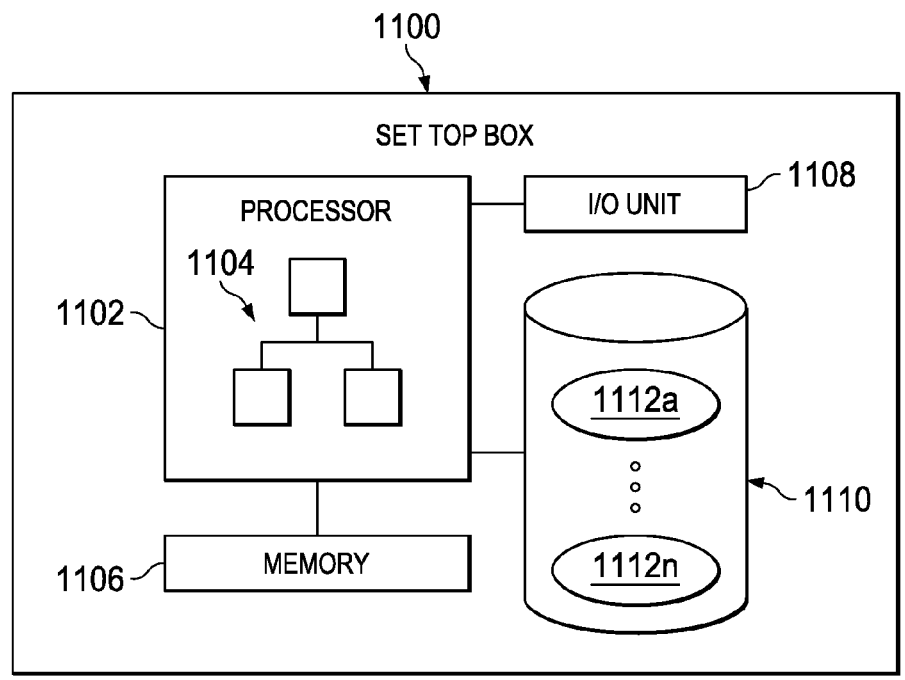
FIG. 11 is a block diagram of an illustrative set-top box that enables a subscriber to interface with a webserver.

With regard to FIG. 11, a block diagram of an illustrative set-top box 1100 may be configured as a universal set-top box that is capable of downloading codecs from different content providers, is shown. The set-top box 1100 may include a processing unit 1102 that executes software 1104. The software may be capable of accessing and downloading content from a content mall or virtual broadcaster, as previously described herein. The processing unit 1102 may be in communication with a memory 1106 that is configured to store data and software, I/O unit 1108 that is configured to communicate over a communications network using an IP protocol, for example, and a storage unit 1110 that is configured to store one or more data repositories 1112*a*-1112*n* (collectively 1112). The data repositories 1112 may be configured to store information associated with a user of the set-top box, including name, address, DRM keys, login names and passwords, preferences, and any other settings that may be utilized to manage users at a user location. For example, the set-top box 1100 may be configured to reduce the ability for a child to access adult content, thereby enabling the users of the set-top box 1100 to login with a name and password so that the children cannot access certain content as limited by a user of the user control panel of FIG. 5D. The data repositories may be configured to store video, music, or gaming content, for example, that the user requests to record on the set-top box 1100. In one embodiment, the set-top box may operate as a digital video recorder, as understood in the art.

Figure 12:
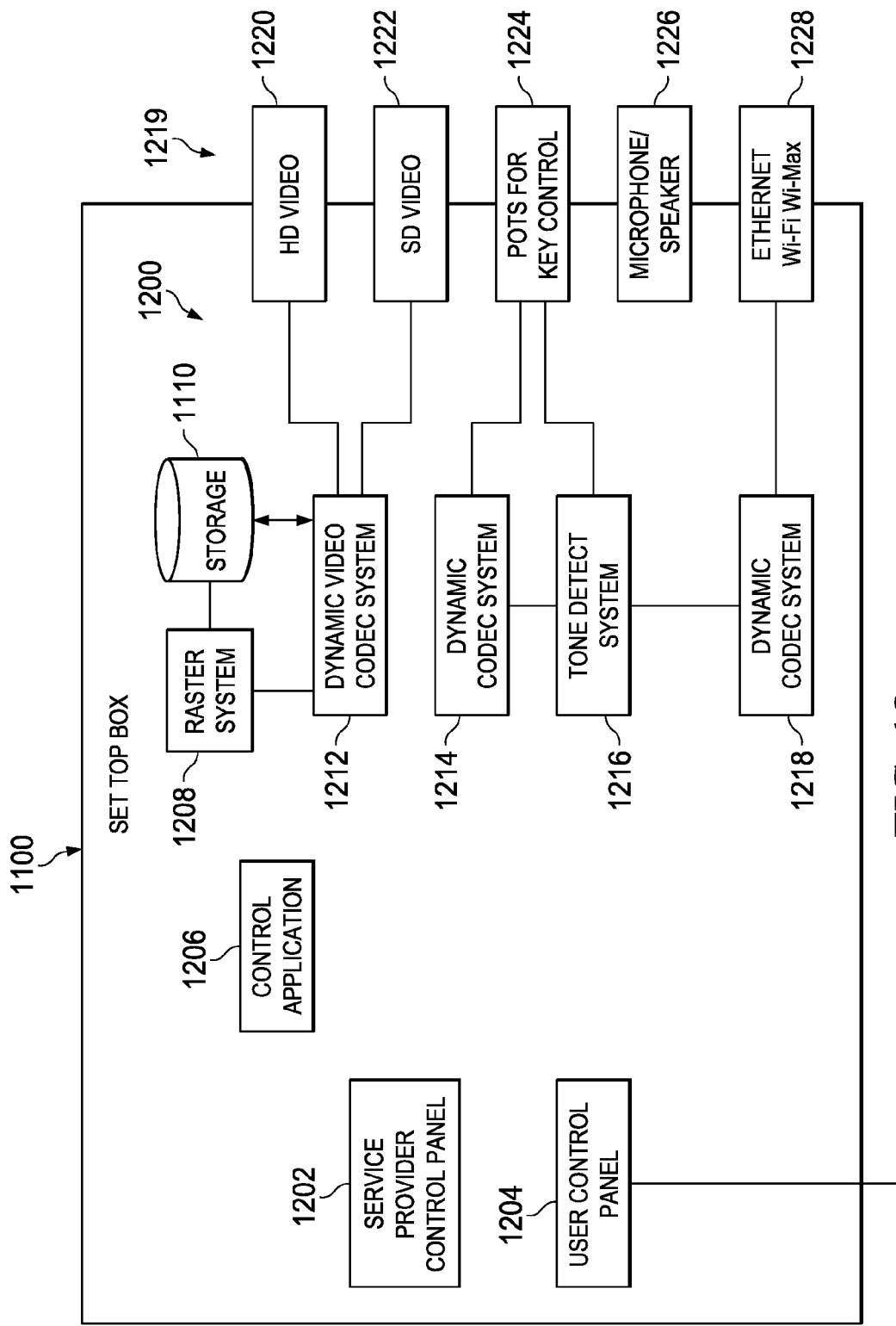
FIG. 12 is a block diagram of a more detailed version of the set-top box of FIG. 7A.

With regard to FIG. 12, a block diagram of modules 1200 executing on the set-top box 1100 is shown. The modules 1200 may be executed on the processing unit 1102 (FIG. 11), and may include a service provider control panel 1202 that enables a service provider to control operation of the set-top box 1100. The service provider control panel 1202 may provide a graphical user interface or other interface that enables the service provider to adjust certain parameters, such as channel access, and or remove codecs, or perform other functions that enable the set-top box 1100 to operate with a communications network provided by the communications service provider.

A user control panel 1204 may enable a user to control operation of the set-top box 1100. The user control panel 1204 may be accessed via a remote control device, as understood in the art. The user control panel 1204 may further provide the users with the ability to control certain operation of the set-top box 1100, such as usernames, passwords, or any other information, as understood in the art.

A control application 1206 may provide for control of the set-top box 1100 by controlling recording schedules, access for use of the set-top box 1100 by requesting name and password, managing recorded content, adjusting time settings, and so on. The control application 1206 may be accessed using a remote control device or by selecting hard-buttons located on the set-top box 1100.

A raster system 1208 may be configured to rasterize content that is received or stored on the set-top box 1100. The raster system 1208 may be used for up or down converting video content for storage in the storage unit 1110, and for preparing the video content for distribution to different device types with different screen formats.

A dynamic video codec system 1212 may be configured to perform coding and decoding operations on the set-top box 1100 as video content is being received by the set-top box 1100. The dynamic video codec system may be updated with different codecs provided by different content providers that are operating on a content mall. A dynamic codec system 1214 may be configured to operate as a coder/decoder for non-video content, including audio tones that are received by a tone detect system 1216. The tone detect system 1216 may be configured to receive tones, such as dual-tone multiple frequency (DTMF) signals from telephones, fax machines, or otherwise, and detect the signals for processing by the dynamic codec system 1214. A dynamic codec system 1218 may be configured to process non-video signals that are received from local wireless devices using one or more wireless communications protocols, such as Ethernet, Wi-Fi, Wi-Max, or other local wireless communications protocols.

A number of input/output modules or ports 1219 may be configured to receive video, audio, and data signals from a communications network, such as the Internet, PSTN, or wireless devices, such as computers, mobile devices, remote controllers, etc. The ports 1219 may include an HD video port 1220 that is configured to receive HD video content. An SD video port 1222 may be configured to receive standard definition video. A POTS for key control port 1224 may be configured to receive signals from a plain old telephone system (POTS) in the form of dual-tone multiple frequency signals, a microphone/speaker port 1226 may be configured to receive audio signals from a microphone or communicate audio signals to speakers. A data port 1228 may be configured to receive local wireless communication signals, such as Ethernet signals, Wi-Fi signals, Wi-Max signals, or otherwise. The data port 1228 may be configured to receive signals from a wired input line. The data port 1228 may also be configured to communicate wired or wireless signals using one or more communications protocols, as understood in the art.

Figure 13:
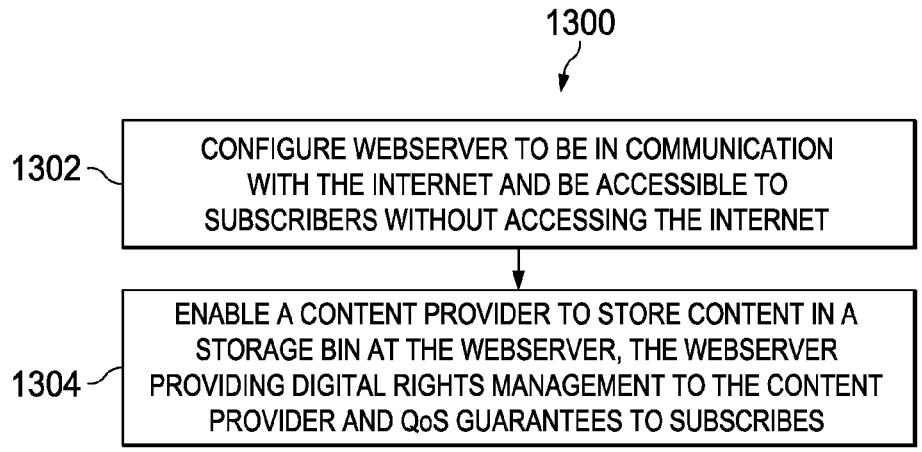
FIG. 13 is a flow diagram of an illustrative process for providing functionality of a content server.

With regard to FIG. 13, a flow diagram of an illustrative process for distributing content of a content provider is shown. The process starts us at 1302, where a webserver or service provider server may be configured to be in communication with the Internet and be accessible to subscribers without accessing the Internet. At step 1304, a content provider may be enabled to store content in a storage bin at the webserver, where the webserver provides digital rights management to the content provider and QoS guarantees to subscribers. When users download the content, the content is downloaded with guaranteed QoS. In one embodiment, the content is video content, where the video content may be movies, television shows, or any other content, as understood in the art.

Figure 14:
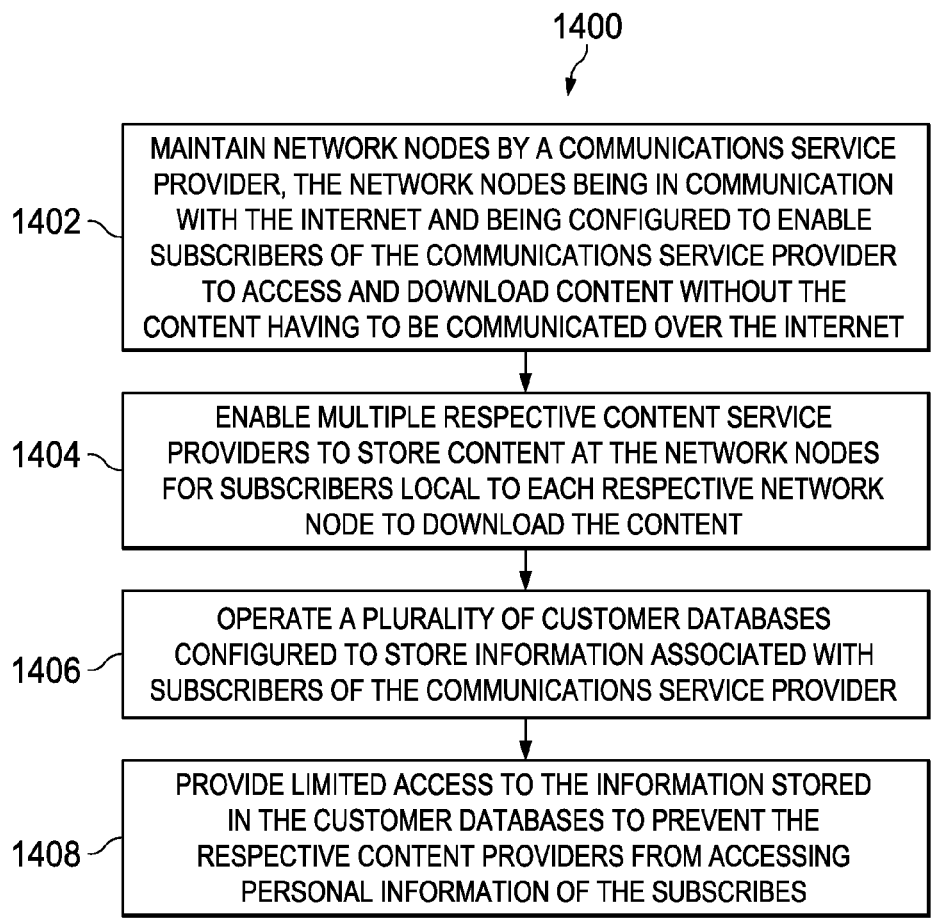
FIG. 14 is a flow diagram of an illustrative process for a communications service provider for providing functionality of a data mall.

With regard to FIG. 14, a flow diagram of an illustrative process 1400 for distributing content to subscribers of a communication service provider is shown. The process 1400 starts at step 1402, where network nodes maintained by communications service provider is performed. The network nodes may be in communication with the Internet and be configured to enable subscribers of the communications service provider to access and download content without the content having to be communicated over the Internet. At step 1404, multiple respective content service providers may be enabled to store content at the network nodes for subscribers local to each respective network node to download the content. At step 1406, multiple customer databases may be configured to store information associated with subscribers of the communications service provider may be operated. The information associated with subscribers may include demographic information, address information, and other information associated with the subscribers. At step 1408, limited access may be provided to the information stored in the customer databases to the content providers to prevent the respective content providers from accessing personal information of the subscribers. By limiting information to the subscribers, the content providers may advertise to the subscribers and the communications service provider may maintain anonymity of the subscribers while providing targeted advertising for the content providers or advertisers who advertise with content that is downloaded or pushed to subscribers.

Figure 15:
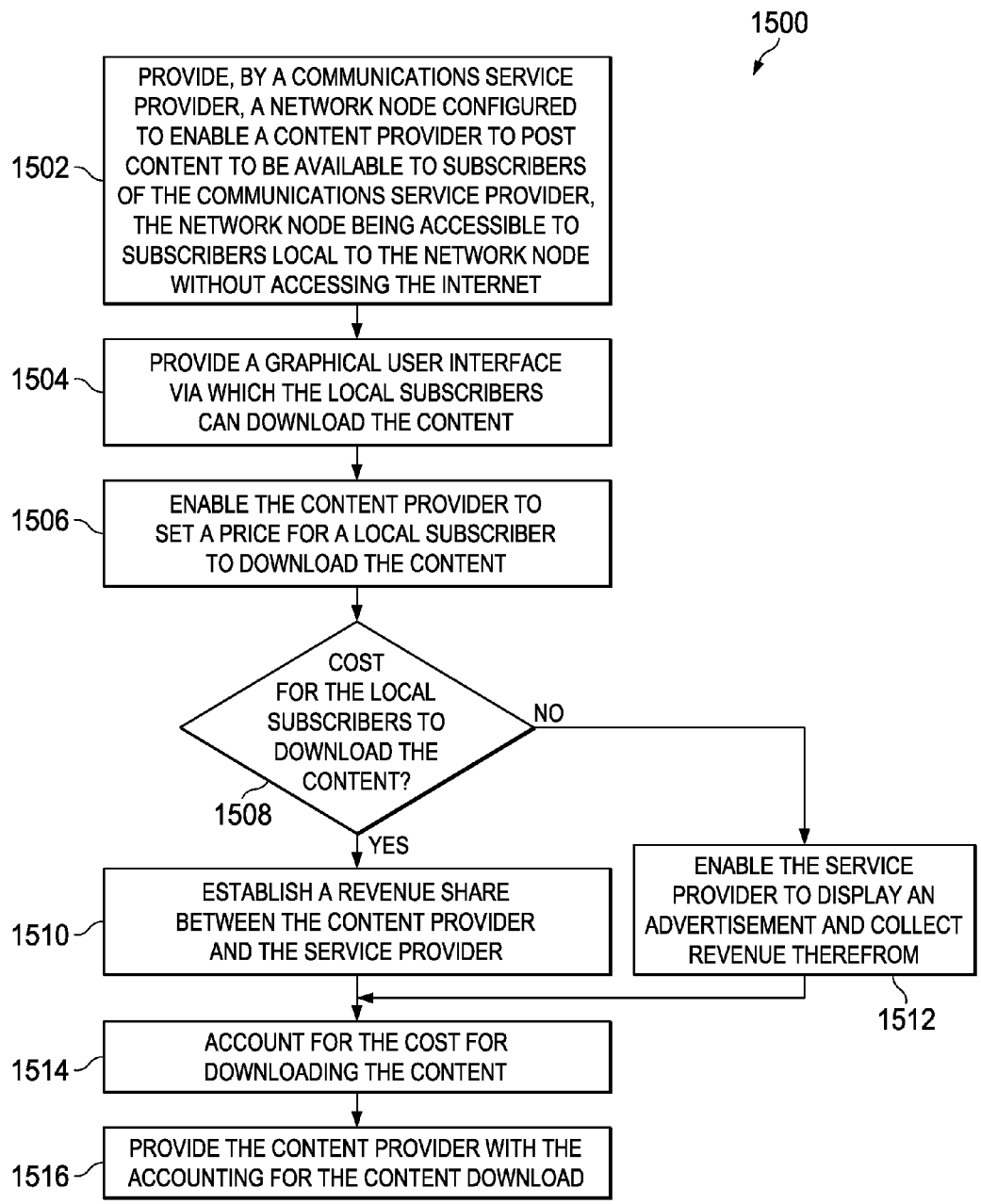
FIG. 15 is a flow diagram of an illustrative process for a communications service provider in providing a revenue sharing model with a content provider.

With regard to FIG. 15, a flow diagram of an illustrative process for a communications service provider and content provider to share revenue is shown. The process 1500 starts at step 1502, where a communications service provider may provide a network node configured to enable a content provider to post content to be available to subscribers of the communications service provider. The network node may be accessible to subscribers local to the network node without accessing the Internet. At step 1504, a graphical user interface via which the local subscribers can download the content may be provided. At step 1506, the content provider may be enabled to set a price for a local subscriber to download the content. In one embodiment, the price may be a fixed price. Alternatively, the price may be a variable price based on an amount of demand for particular content. For example, if demand for content is high, then the price for the content may increase. Alternatively, if the demand for the content is low, the price for the content may decrease. A supply and demand curve or formula may be used in dynamically changing the price of the content. In yet another embodiment, the content provider may set a price for the local subscriber to download as much content as desired.

At step 1508, a determination may be made as to whether the content provider has established a cost for the local subscribers to download the content (i.e., whether the content is free or a cost is required for download). If so, then at step 1510, a revenue share between the content provider and the service provider may be established. In one embodiment, the revenue share may be a percentage of the revenue that is generated by the content provider in having its content downloaded. Alternatively, the revenue share may be a fixed price for each content (e.g., television show) being downloaded. If, at step 1508, the content is determined to be free for subscribers to download, then the communications service provider may be enabled to display an advertisement and collect revenue from displaying the advertisement. The service provider may display the advertisement prior to or during play of the content that is downloaded for free. By enabling the service provider to have airtime for displaying one or more advertisements, the service provider is compensated for the content provider having a content storefront or virtual television station. At step 1514, an accounting for the cost for downloading the content may be made. The content provider may be provided with the accounting for the content download in step 1516, thereby enabling the content provider to pay the communications service provider based on the accounting.

Figure 16:
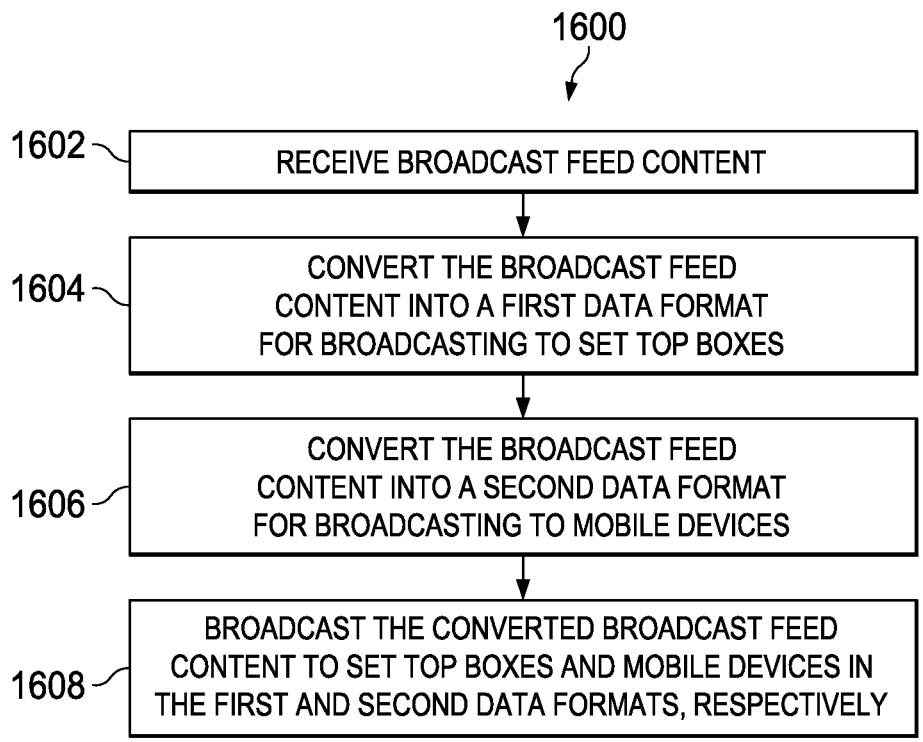
FIG. 16 is a flow diagram of an illustrative process for operation of a set-top box.

With regard to FIG. 16, a flow diagram of an illustrative process 1600 for broadcasting content as IPTV is shown. The process starts at step 1602, where broadcast feed content is received. The broadcast feed content may be any video or audio content that is program content, live content, or other content that is streamed or broadcast to users. At step 1604, the broadcast feed content may be converted into a first data format for broadcasting to set-top boxes. At step 1606, the broadcast feed content may be converted into a second data format for broadcasting to mobile devices. The conversion of the broadcast feed content into the second data format may be rasterized, if video content, so that the video content is resized to fit on a small display of a mobile device. Analogous conversion may be made for audio content. At step 1608, the converted broadcast feed content may be broadcast to the set-top boxes and mobile devices in the first and second data formats, respectively.

Figure 17:
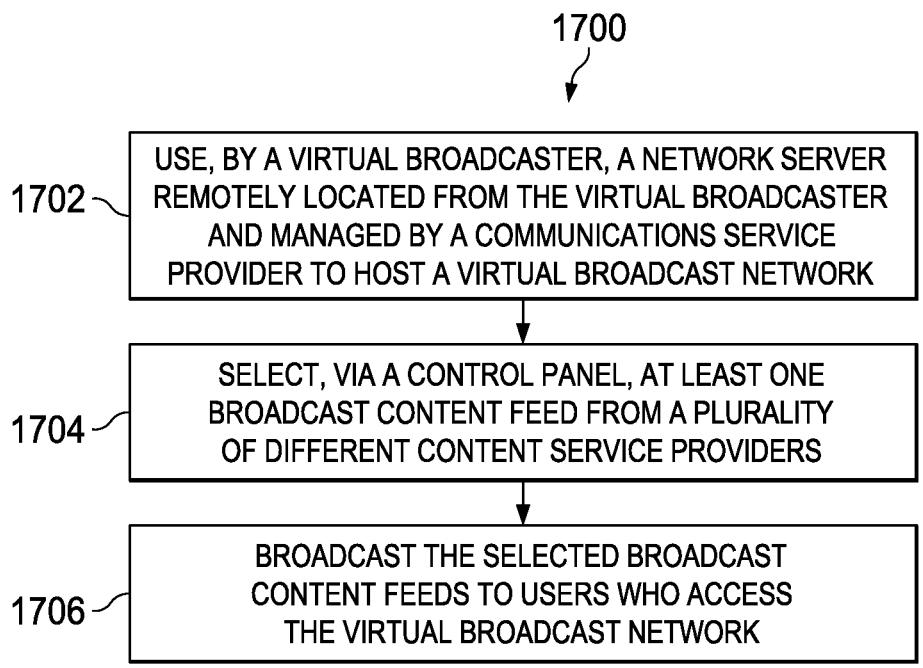
FIG. 17 is a flow diagram of an illustrative process for mapping broadcast content from one content provider to another for broadcast from a virtual IPTV network.

With regard to FIG. 17, a flow diagram of an illustrative process 1700 is shown. The process 1700 starts at step 1702, where a virtual broadcaster may use a network server remotely located from the virtual broadcaster (i.e., via a communications network) and managed by a communications service provider to host a virtual broadcast network. At step 1714, at least one broadcast content feed may be selected via a control panel from a plurality of different content service providers (i.e., content providers). The different content service providers may have their own virtual television networks hosted by the communications service provider on the same or different service provider servers or network servers. Alternatively, the different content providers may provide the communications service provider with the content feeds and not have the virtual broadcast networks. At step 1706, the selected broadcast content feeds may be broadcast to users who access the virtual broadcast network. In broadcasting the selected broadcast content feeds, the content may be communicated via a communications network that is wired or wireless. Furthermore, the content may include advertising content that is stored in and inserted into or communicated with the content of the content provider. The airtime may be provided exclusively to the content provider or divided into national and local airtime that is split between the communications service provider and content provider at any percentage established between the two parties.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for distributing content over a network, the method comprising:

providing by a communications service provider a content distribution node, wherein content stored by the content distribution node is accessible to subscriber of the communications service provider without traversing the Internet;

providing, via the content distribution node, a content mall comprising a plurality of content stores, wherein each of the content stores employs a CODEC proprietary to that content store to encode content stored on that content store;

providing a set-top box software repository having one or more software modules, each software module associated respectively with a content store of the plurality of content stores, wherein each software module allows a set-top box to access the respectively associated content store;

providing a centralized CODEC storage facility for content providers to store CODECS for download by subscribers of the communication service provider;

providing an advertisement repository storing one or more sets of advertisements, each set of advertisements associated respectively with a content store of the plurality of content stores, wherein each set of advertisements displays only with content from the respectively associated content store; and granting access, via the content distribution node, to a plurality of content providers to store:
content to a respective content store in the content mall, wherein each content provider maintains control over content stored in their respective content store;
a content provider software module associated with the respective content store; and
a set of advertisements associated with the respective content store.

2. The method of claim 1, further comprising configuring a user interface to enable the content provider to set a quality of service for distributing content from their respective content store.

3. The method of claim 1, further comprising configuring a user interface to enable the content provider to partition a storage space associated with their respective content store for storing different types of content.

4. The method of claim 1, further comprising configuring a user interface to enable the content provider to set pricing for different content in their respective content store.

5. The method of claim 1, further comprising configuring a user interface to enable the content provider to remove content from their respective content store without notifying the communications service provider.

6. The method of claim 1, further comprising configuring the content distribution node to enable the plurality of content providers to store software to their respective content stores for enabling subscriber devices to display content associated with their respective content store.

7. The method of claim 1, further comprising configuring a user interface to enable the content provider to limit distribution of a particular content in their respective content store.

8. The method of claim 7, wherein a distribution limit of the content is limited a certain number of distributions.

9. The method of claim 7, wherein a distribution limit of the content is limited a certain period of time that the content can be distributed.

10. The method of claim 9, wherein the period of time that the content can be distributed is a period of hours within a day.

11. The method of claim 1, further comprising configuring a user interface to enable the content provider to set a bandwidth limit for distributing a particular content from their respective content store.

12. The method of claim 1, further comprising configuring a user interface to enable the content provider to receive subscriber feedback associated with a particular content from their respective content store.

13. The method of claim 1, further comprising configuring the content distribution node to monitor the distribution of content from a content provider store and billing the content provider based on a revenue sharing fee.

14. The method of claim 1, further comprising:
determining whether a subscriber fee is associated with a content in a content store;
responsive to a determination that the subscriber fee is associated with the content in the content store, billing the content provider based on a revenue sharing fee in response to the content being distributed to a subscriber of the communications service provider; and
responsive to a determination that no subscriber fee is associated with the content in the content store, inserting advertisement selected by the communications service provider as part of the content being distributed to the subscriber of the communications service provider.

15. The method of claim 1, further comprising configuring by the communications service provider the content distribution node to limit a type of content that may be distributed in a content store by a content provider.

16. The method of claim 1, further comprising configuring by the communications service provider the content distribution node to utilize subscriber personal information for distributing the content and restricting the plurality of content providers from accessing the subscriber personal information.

17. A system for distributing content over a network, the system comprising:
a data storage unit configured to store content;
a network interface for communicatively coupling to the network;
a memory component configured to store data and executable instructions;
a processing unit configured to execute the executable instructions to:
provide a content mall that is accessible to subscribers of a communications service provider without traversing the Internet, the content mall comprising a plurality of content stores, wherein each of the content stores employs a CODEC proprietary to that content store to encode content stored on that content store;
provide a set-top box software repository having one or more software modules, each software module associated respectively with a content store of the plurality of content stores, wherein each software module allows a set-top box to access the respectively associated content store;
provide a centralized CODEC storage facility for content providers to store CODECS for download by subscribers of the communication service provider;
providing an advertisement repository storing one or more sets of advertisements, each set of advertisements associated respectively with a content store of the plurality of content stores, wherein each set of advertisements displays only with content from the respectively associated content store; and
grant access to a plurality of content providers to store:

content to a respective content store in the content mall, wherein each content provider maintains control over content stored in their respective content store;

a content provider software module associated with the respective content store; and a set of advertisements associated with the respective content store.

18. The system of claim 17, wherein the processing unit is further configured to execute instructions to:

determine whether a subscriber fee is associated with a content in a content store;

responsive to a determination that the subscriber fee is associated with the content in the content store, bill the content provider based on a revenue sharing fee in response to the content being distributed to a subscriber of the communications service provider; and responsive to a determination that no subscriber fee is associated with the content in the content store, insert advertisement selected by the communications service provider as part of the content being distributed to the subscriber of the communications service provider.

19. The system of claim 17, wherein the processing unit is further configured to execute instructions to provide a user interface to enable a content provider to set restrictions on distribution of content, add and remove content, and set a quality of service guarantee associated with a particular content.

20. A computer program product comprising a non-transitory computer usable medium having a computer readable program code embodied therein, said computer readable program code comprising instructions to:

provide a content mall that is accessible to subscribers of a communications service provider without traversing the Internet, the content mall comprising a plurality of content stores, wherein each of the content stores employs a CODEC proprietary to that content store to encode content stored on that content store;

provide a set-top box software repository having one or more software modules, each software module associated respectively with a content store of the plurality of content stores, wherein each software module allows a set-top box to access the respectively associated content store provide a centralized CODEC storage facility for content providers to store CODECS for download by subscribers of the communication service provider;

providing an advertisement repository storing one or more sets of advertisements, each set of advertisements associated respectively with a content store of the plurality of content stores, wherein each set of advertisements displays only with content from the respectively associated content store; and grant access to a plurality of content providers to store:

content to a respective content store in the content mall, wherein a content provider maintains control over content stored in their respective content store;

a content provider software module associated with the respective content store; and a set of advertisements associated with the respective content store.

* * * * *